United States Patent
Peredriy et al.

(10) Patent No.: US 11,435,499 B1
(45) Date of Patent: Sep. 6, 2022

(54) MACHINE-LEARNING TECHNIQUES FOR AUTOMATICALLY IDENTIFYING TOPS OF GEOLOGICAL LAYERS IN SUBTERRANEAN FORMATIONS

(71) Applicant: SAS Institute Inc., Cary, NC (US)

(72) Inventors: Sergiy Peredriy, Auburndale, MA (US); Keith Richard Holdaway, Durham, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 17/481,839

(22) Filed: Sep. 22, 2021

Related U.S. Application Data

(60) Provisional application No. 63/172,483, filed on Apr. 8, 2021.

(51) Int. Cl.
*E21B 49/00* (2006.01)
*G01V 99/00* (2009.01)
*G06N 20/00* (2019.01)

(52) U.S. Cl.
CPC ............ *G01V 99/005* (2013.01); *E21B 49/00* (2013.01); *E21B 2200/20* (2020.05); *E21B 2200/22* (2020.05); *G06N 20/00* (2019.01)

(58) Field of Classification Search
CPC ... G01V 99/005; E21B 49/00; E21B 2200/20; E21B 2200/22; G06N 20/00
See application file for complete search history.

(56) References Cited

U.S. PATENT DOCUMENTS

| 11,008,837 B2 | 5/2021 | Kim et al. |
| 11,010,629 B2 | 5/2021 | Feng et al. |

(Continued)

FOREIGN PATENT DOCUMENTS

| EP | 3293552 B1 | 5/2021 |
| GB | 2576593 B | 5/2021 |

(Continued)

OTHER PUBLICATIONS

Ulrike von Luxburg, "A Tutorial on Spectral Clustering", Statistics and Computing, 17 (4), pp. 1-32 (2007).

(Continued)

*Primary Examiner* — Toan M Le
*Assistant Examiner* — Xiuqin Sun
(74) *Attorney, Agent, or Firm* — Kilpatrick Townsend & Stockton LLP

(57) ABSTRACT

Tops of geological layers can be automatically identified using machine-learning techniques as described herein. In one example, a system can receive well log records associated with wellbores drilled through geological layers. The system can generate well clusters by applying a clustering process to the well log records. The system can then obtain a respective set of training data associated with a well cluster, train a machine-learning model based on the respective set of training data, select a target well-log record associated with a target wellbore of the well cluster, and provide the target well-log record as input to the trained machine-learning model. Based on an output from the trained machine-learning model, the system can determine the geological tops of the geological layers in a region surrounding the target wellbore. The system may then transmit an electronic signal indicating the geological tops of the geological layers associated with the target wellbore.

29 Claims, 19 Drawing Sheets

(56) References Cited

U.S. PATENT DOCUMENTS

| | | | |
|---|---|---|---|
| 11,010,969 B1 | 5/2021 | Li et al. | |
| 11,015,106 B2 | 5/2021 | Misino et al. | |
| 11,015,433 B2 | 5/2021 | Li et al. | |
| 11,015,447 B2 | 5/2021 | Zainalabedin et al. | |
| 11,016,208 B2 | 5/2021 | Lecerf et al. | |
| 11,022,709 B2 | 6/2021 | Flemings et al. | |
| 11,022,710 B2 | 6/2021 | Awfi | |
| 11,022,717 B2 | 6/2021 | Ohanian, III et al. | |
| 2013/0110485 A1* | 5/2013 | Li | G01V 99/005 703/10 |
| 2014/0316706 A1 | 10/2014 | Grant et al. | |
| 2015/0088424 A1 | 3/2015 | Burlakov et al. | |
| 2018/0241764 A1* | 8/2018 | Nadolski | H04L 63/20 |
| 2019/0383133 A1 | 12/2019 | Pollack et al. | |
| 2020/0340350 A1* | 10/2020 | Denisenko | E21B 7/046 |
| 2021/0110280 A1* | 4/2021 | Akkurt | G06N 20/10 |
| 2021/0165124 A1 | 6/2021 | Ross et al. | |

FOREIGN PATENT DOCUMENTS

| | | |
|---|---|---|
| WO | 2015031531 A1 | 3/2015 |
| WO | 2018208634 A1 | 11/2018 |

OTHER PUBLICATIONS

PCT/US2021/051596, International Search Report and Written Opinion dated Dec. 10, 2021, 7 pages.

\* cited by examiner

MACHINE-LEARNING TECHNIQUES FOR AUTOMATICALLY IDENTIFYING TOPS OF GEOLOGICAL LAYERS IN SUBTERRANEAN FORMATIONS

REFERENCE TO RELATED APPLICATION

This claims the benefit of priority under 35 U.S.C. § 119(e) to U.S. Provisional Patent Application No. 63/172,483, filed Apr. 8, 2021, the entirety of which is hereby incorporated by reference herein.

TECHNICAL FIELD

The present disclosure relates generally to extracting natural resources from subterranean formations. More specifically, but not by way of limitation, this disclosure relates to machine-learning techniques for automatically identifying tops of geological layers to assist with extracting natural resources (e.g., oil, water, and gas) from subterranean formations.

BACKGROUND

A subterranean formation can include a succession of geological layers that are stacked on top of on another along a depth scale. Each geological layer can contain a relatively homogeneous set of geological properties (e.g., lithology, chemical composition, and physical properties) throughout its expanse. The depth location at which two adjacently stacked geological layers interface can be referred to as a "geological top." Natural resources can be located in reservoirs embedded within or between the geological layers.

Well systems can be used to extract natural resources from a subterranean formation. A well system can include one or more wellbores drilled through the subterranean formation. To help detect the presence of a target natural resource, well logging tools can be lowered into each wellbore to analyze or otherwise study the geological properties of the formation region surrounding the wellbore. The well logging tools may include nuclear, gamma ray, electromagnetic, sonic, magnetic, or other measurement equipment for detecting the geological properties of the formation region. The measurement equipment can generate well log records that can include measurements collected over time as a function of depth. The well log records from one or more wellbores can be provided to a geologist, who can manually review the well log records to identify geological layers (e.g., strata) or other features of interest in the subterranean formation.

SUMMARY

One example of the present disclosure is a system that includes one or more processors and one or more memory devices. The one or more memory devices can include instructions that are executable by the one or more processors for causing the one or more processors to perform operations. The operations can include receiving a plurality of well log records associated with a plurality of wellbores drilled through geological layers. The operations can include generating a plurality of well clusters by applying a clustering process. The clustering process can involve determining statistical distances between pairs of well log records in the plurality of well log records, the statistical distances including a respective statistical distance between each pair of well log records in the plurality of well log records, wherein the respective statistical distance between a respective pair of well log records is determined based on a respective pair of matrices generated from the respective pair of well log records. The clustering process can involve determining geographical distances between pairs of wellbores in the plurality of wellbores, the geographical distances including a respective geographical distance between each pair of wellbores in the plurality of wellbores. The clustering process can involve generating a similarity matrix based on the statistical distances and the geographical distances, the similarity matrix including similarity values indicating a respective similarity between each pair of wellbores in the plurality of wellbores. The clustering process can involve determining the plurality of well clusters using the similarity matrix. The operations can include, for each well cluster in the plurality of well clusters: obtaining a respective set of training data associated with the well cluster, wherein the respective set of training data includes a set of well log records labeled to indicate geological tops of the geological layers and to indicate types of the geological layers; training a machine-learning model based on the respective set of training data to generate a trained machine-learning model; selecting a target well-log record associated with a target wellbore of the well cluster, wherein the respective set of training data excludes the target well-log record; providing the target well-log record as input to the trained machine-learning model, the trained machine-learning model being configured to generate an output usable to identify the geological tops of the geological layers in a region surrounding the target wellbore; determining, based on the output from the trained machine-learning model, the geological tops of the geological layers in the region surrounding the target wellbore; and transmitting an electronic signal indicating the geological tops of the geological layers in the region surrounding the target wellbore.

Another example of the present disclosure is a non-transitory computer-readable medium comprising program code that is executable by one or more processors for causing the one or more processors to perform operations. The operations can include receiving a plurality of well log records associated with a plurality of wellbores drilled through geological layers. The operations can include generating a plurality of well clusters by applying a clustering process. The clustering process can involve determining statistical distances between pairs of well log records in the plurality of well log records, the statistical distances including a respective statistical distance between each pair of well log records in the plurality of well log records, wherein the respective statistical distance between a respective pair of well log records is determined based on a respective pair of matrices generated from the respective pair of well log records. The clustering process can involve determining geographical distances between pairs of wellbores in the plurality of wellbores, the geographical distances including a respective geographical distance between each pair of wellbores in the plurality of wellbores. The clustering process can involve generating a similarity matrix based on the statistical distances and the geographical distances, the similarity matrix including similarity values indicating a respective similarity between each pair of wellbores in the plurality of wellbores. The clustering process can involve determining the plurality of well clusters using the similarity matrix. The operations can include, for each well cluster in the plurality of well clusters: obtaining a respective set of training data associated with the well cluster, wherein the respective set of training data includes a set of well log records labeled to indicate geological tops of the geological layers and to indicate types of the geological layers; training a machine-learning model based on the respective set of training data to generate a trained machine-learning model; selecting a target well-log record associated with a target wellbore of the well cluster, wherein the respective set of training data excludes the target well-log record; providing the target well-log record as input to the trained machine-learning model, the trained machine-learning model being configured to generate an output usable to identify the geological tops of the geological layers in a region surrounding the target wellbore; determining, based on the output from the trained machine-learning model, the geological tops of the geological layers in the region surrounding the target wellbore; and transmitting an electronic signal indicating the geological tops of the geological layers in the region surrounding the target wellbore.

Yet another example of the present disclosure is a method including computer-implemented operations. The operations can include receiving a plurality of well log records associated with a plurality of wellbores drilled through geological layers. The operations can include generating a plurality of well clusters by applying a clustering process. The clustering process can involve determining statistical distances between pairs of well log records in the plurality of well log records, the statistical distances including a respective statistical distance between each pair of well log records in the plurality of well log records, wherein the respective statistical distance between a respective pair of well log records is determined based on a respective pair of matrices generated from the respective pair of well log records. The clustering process can involve determining geographical distances between pairs of wellbores in the plurality of wellbores, the geographical distances including a respective geographical distance between each pair of wellbores in the plurality of wellbores. The clustering process can involve generating a similarity matrix based on the statistical distances and the geographical distances, the similarity matrix including similarity values indicating a respective similarity between each pair of wellbores in the plurality of wellbores. The clustering process can involve determining the plurality of well clusters using the similarity matrix. The operations can include, for each well cluster in the plurality of well clusters: obtaining a respective set of training data associated with the well cluster, wherein the respective set of training data includes a set of well log records labeled to indicate geological tops of the geological layers and to indicate types of the geological layers; training a machine-learning model based on the respective set of training data to generate a trained machine-learning model; selecting a target well-log record associated with a target wellbore of the well cluster, wherein the respective set of training data excludes the target well-log record; providing the target well-log record as input to the trained machine-learning model, the trained machine-learning model being configured to generate an output usable to identify the geological tops of the geological layers in a region surrounding the target wellbore; determining, based on the output from the trained machine-learning model, the geological tops of the geological layers in the region surrounding the target wellbore; and transmitting an electronic signal indicating the geological tops of the geological layers in the region surrounding the target wellbore, Some or all of the operations can be performed by one or more processors.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

BRIEF DESCRIPTION OF THE DRAWINGS

The present disclosure is described in conjunction with the appended figures.

Figure 1:
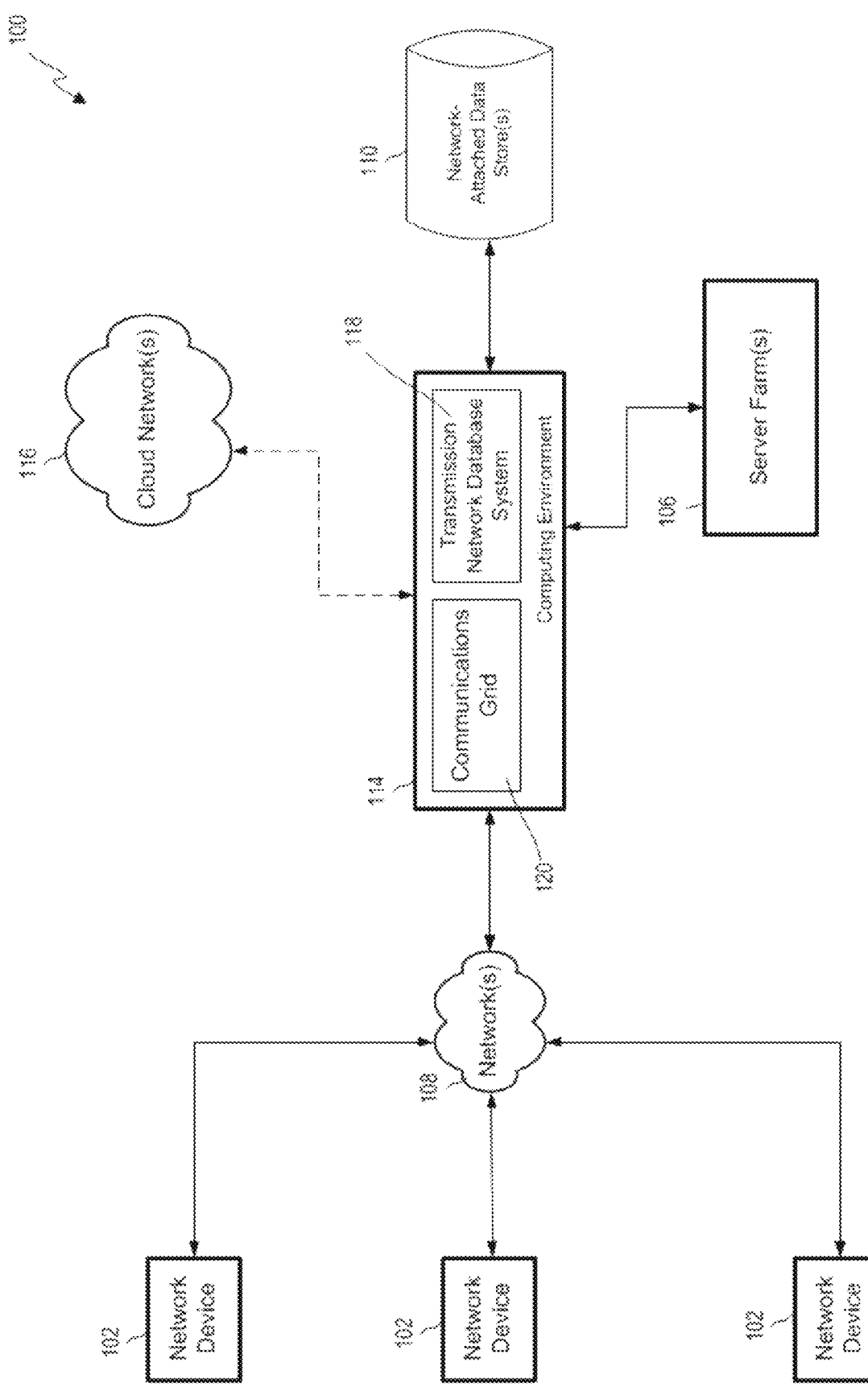
FIG. 1 depicts a block diagram of an example of a computing system according to some aspects.

In the appended figures, similar components or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Well systems may include hundreds or thousands of wellbores drilled through multiple geological layers of a subterranean formation. The wellbores can be geographically spaced apart at any suitable distance, for example at quarter-mile or half-mile distances. The wellbores may be probed using well logging tools to create hundreds or thousands of well log records. Typically, a geologist manually interprets the well log records to try to identify, track, and map the locations of geological features such as geological layers in the subterranean formation. But the manual identification of such features in the well log records can be a slow and challenging process that requires skill and judgment, because the locations of such features are not always obvious from the well log records. Mapping geological features between well log records can also be a difficult process in which the trace features (e.g., geological tops) in one well log record are identified and matched to the trace features in the other well log records. This process is referred to as "correlation."

Manual correlation can be time consuming, subjective, expensive, and can require specific geological training and expertise. For example, it can take six months or more for a geologist to identify and correlate geological tops in a set of well log records, thereby significantly delaying subsequent well operations that rely on the correlation results. Because the final interpretation of the well log records can depend on the experience and education of the individual geologist (e.g., petrophysicist) performing the analysis, there may be a high degree of subjectivity in which different geologists may interpret well log records in different ways that produce different results, which can significantly impact well operations. On top of these issues, the subjective nature of such manual interpretation increases the likelihood of mistakes, which can be catastrophic. For example, it may be important fora well operator to know the locations of certain geological features (e.g., faults and geological tops) when determining where and how to drill a wellbore or perforate a wellbore casing. If these geological features are misidentified by a geologist during the correlation process, the well operator may accidentally drill or perforate in an undesirable or dangerous location (e.g., areas that could cause regional earthquakes, areas with high amounts of undesirable gas like radon or methane, areas where the geological formations tend to destroy drill bits, etc.). This can be an expensive mistake that can damage well equipment, wellbores, and the subterranean formation, may create hazardous conditions, and may even require abandonment of the wellbore or wellsite. Thus, an accurate correlation process can be important not only in determining where to perform well operations such as drilling, but also in determining where not to perform certain well operations.

Some examples of the present disclosure can overcome one or more of the abovementioned problems by using machine-learning models to automatically identify geological tops in well log records. The identified tops can then be automatically correlated with one another. The identified tops and correlations can be used in simulations (e.g., drilling or reservoir simulations) and in other ways to inform subsequent well operations. This can be a more rapid, objective, consistent, and accurate way to identify and correlate geological features than alternative approaches like using manual correlation.

As one example, a system can receive well log records associated with a group of wellbores drilled through geological layers. The system can assign the wellbores into different clusters by executing a clustering process based on their respective well log records. The clustering process can generate multiple clusters of wellbores in which similar wellbores are grouped together into the same cluster. A cluster of wellbores can be referred to herein as a well cluster. Within a particular well cluster, training wells and target wells can be identified. This identification can be performed manually by a user or automatically based on a set of rules. The well log records from the training wells can referred to as training logs, and the well log records from the target wells can be referred to as target logs. The training logs can be annotated with labels indicating the geological taps of geological layers and the types of the geological layers, so that the training logs can serve as training data for training a machine-learning model associated with the well cluster. This annotation can be performed manually by one or more users or automatically by the system, for example using semi-supervised machine-learning techniques. With the training data generated, the machine-learning model can then be trained based on the training data to generate a trained machine-learning model associated with the well cluster.

Next, a target log associated with the well cluster can be selected (e.g., by the user) and input into the trained machine-learning model, which can generate outputs indicating the type of geological layer present at each depth (e.g., measured depth) in the target log. Based on the outputs, the system can automatically identify the tops of the geological layers represented in the target log. For example, the system can determine that a series of consecutive depths associated with a first layer type corresponds to a first geological layer, that another series of consecutive depths associated with a second layer type corresponds to a second geological layer, and that a depth corresponding to an interface between the two geological layers is a geological top. This process can be repeated for each target log associated with the well cluster to determine the tops and types of geological layers represented in the target logs. The top and type information may then be stored in memory for subsequent use. The above process can also be iterated for each of the other well clusters. For example, a unique machine-learning model can trained for each well cluster based on training logs from that well cluster. The system can then use the trained machine-learning models to identify the tops and types of geological layers across some or all of the received well log records.

Once the tops and types of the geological layers have been determined with respect to each well log record, in some examples the system can automatically correlate the geological layers to one another across two or more well log records. For example, the system can identify the same geological top in multiple well log records based on (i) similarities between the depth of the geological top in each well log record, (ii) the adjacent geological layers surrounding the geological top in each well log record, (iii) the types and other characteristics of the adjacent geological layers, or (iv) any combination of these. Once the system has identified the same geological top in multiple well log records, the system can map the geological top across the multiple well log records, which may provide more holistic and useful information about the geological top and corresponding layers than can be derived from any individual well-log record alone.

To validate the above process, tests were run using varying amounts of training data and well-cluster sizes. The tests revealed that very little training data is required to train the machine-learning models to obtain a relatively high degree of accuracy. For example, one test involved a well cluster containing 23 wellbores, A machine-learning model (e.g., a neural network) was trained based on training log data from a single training well of the well cluster. After the machine-learning model was trained, well log records for the remaining 22 wellbores were input into the trained machine-learning model as target logs. The outputs from the trained machine-learning model were then used by the system to automatically identify geological tops of the geological layers. The results were analyzed against known geological information (e.g., geological tops and layers) and deemed to be 91.3% accurate. Another test involved a well cluster containing 29 wellbores. A machine-learning model was trained based on training log data from a single training well of the well cluster. After the machine-learning model was trained, well log records for the remaining 28 wellbores were input into the trained machine-learning model as target logs. The outputs from the trained machine-learning model were then used by the system to automatically identify geological tops of the geological layers. The results were analyzed against known geological information and deemed to be 89.3% accurate. From these tests, it can be seen that the accuracy of this process can be relatively high even when the amount of training data is relatively low. Additionally, the amount of time taken to implement this process, for example to execute the trained machine-learning model on all of the target logs, can be relatively fast (e.g., a few hours) when compared to alternative approaches. For example, performing a manual analysis of the same set of well log records may take several weeks and yield inconsistent or inaccurate results.

In some examples, the tops and types of geological layers can be used to construct a model, such as a reservoir model or another type of geological model, associated with extracting natural resources from a subterranean formation. The model may be an interactive multi-dimensional (e.g., three-dimensional) graphical representation that can be manipulated and explored by a user. Additionally, the model may be executable on a computer to simulate geological events, well operations (e.g., drilling, casing, perforation, and production operations), and other events of interest. The simulation results and other model features can inform a well operator of which well operations to perform, where to perform them, and how to perform them, for example to achieve the highest level of production or to avoid creating hazardous conditions. Because such models and simulations can be produced in a faster and more efficient way using the automatically generated outputs from the trained machine-learning models as compared to alternative approaches, geologists may also be able to make informed decisions in a more timely manner.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIGS. 1-12 depict examples of systems and methods usable for automatically identifying geological tops according to some aspects. For example, FIG. 1 is a block diagram of an example of the hardware components of a computing system according to some aspects. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. The computing environment 114 may include one or more other systems. For example, computing environment 114 may include a database system 118 or a communications grid 120. The computing environment 114 can include one or more processing devices (e.g., distributed over one or more networks or otherwise in communication with one another) that may be collectively be referred to herein as a processor or a processing device.

Data transmission network 100 also includes one or more network devices 102. Network devices 102 may include client devices that can communicate with computing environment 114. For example, network devices 102 may send data to the computing environment 114 to be processed, may send communications to the computing environment 114 to control different aspects of the computing environment or the data it is processing, among other reasons. Network devices 102 may interact with the computing environment 114 through a number of ways, such as, for example, over one or more networks 108.

In some examples, network devices 102 may provide a large amount of data, either all at once or streaming over a period of time (e.g., using event stream processing (ESP)), to the computing environment 114 via networks 108. For example, the network devices 102 can transmit electronic messages for use in automatically identifying geological tops, all at once or streaming over a period of time, to the computing environment 114 via networks 108.

The network devices 102 may include network computers, sensors, databases, or other devices that may transmit or otherwise provide data to computing environment 114. For example, network devices 102 may include local area network devices, such as routers, hubs, switches, or other computer networking devices. These devices may provide a variety of stored or generated data, such as network data or data specific to the network devices 102 themselves. Network devices 102 may also include sensors that monitor their environment or other devices to collect data regarding that environment or those devices, and such network devices 102 may provide data they collect over time. Network devices 102 may also include devices within the internet of things, such as devices within a home automation network. Some of these devices may be referred to as edge devices, and may involve edge-computing circuitry. Data may be transmitted by network devices 102 directly to computing environment 114 or to network-attached data stores, such as network-attached data stores 110 for storage so that the data may be retrieved later by the computing environment 114 or other portions of data transmission network 100. For example, the network devices 102 can transmit data usable for automatically identifying geological tops to a network-attached data store 110 for storage. The computing environment 114 may later retrieve the data from the network-attached data store 110 and use the data to automatically identify geological tops.

Network-attached data stores 110 can store data to be processed by the computing environment 114 as well as any intermediate or final data generated by the computing system in non-volatile memory. But in certain examples, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated dynamically (e.g., on the fly). In this situation, the computing environment 114 may be configured to retain the processed information within memory so that responses can be generated for the user at different levels of detail as well as allow a user to interactively query against this information.

Network-attached data stores 110 may store a variety of different types of data organized in a variety of different ways and from a variety of different sources. For example, network-attached data stores may include storage other than primary storage located within computing environment 114 that is directly accessible by processors located therein. Network-attached data stores may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves or transitory electronic communications. Examples of a non-transitory medium may include, for example, a magnetic disk or tape, optical storage media such as compact disk or digital versatile disk, flash memory, memory or memory devices. A computer-program product may include code or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data.

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time-stamped data may be aggregated by time (e.g., into daily time period units) to generate time series data or structured hierarchically according to one or more dimensions (e.g., parameters, attributes, or variables). For example, data may be stored in a hierarchical data structure, such as a relational online analytical processing (ROLAP) or multidimensional online analytical processing (MOLAP) database, or may be stored in another tabular form, such as in a flat-hierarchy form.

Data transmission network 100 may also include one or more server farms 106. Computing environment 114 may route select communications or data to the server farms 106 or one or more servers within the server farms 106. Server farms 106 can be configured to provide information in a predetermined manner. For example, server farms 106 may access data to transmit in response to a communication. Server farms 106 may be separately housed from each other device within data transmission network 100, such as computing environment 114, or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more websites, sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain examples, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network 116 can dynamically scale to meet the needs of its users. The cloud network 116 may include one or more computers, servers, or systems. In some examples, the computers, servers, or systems that make up the cloud network 116 are different from the user's own on-premises computers, servers, or systems. For example, the cloud network 116 may host an application, and a user may, via a communication network such as the Internet, order and use the application on demand. In some examples, the cloud network 116 may host an application for automatically identifying geological tops.

While each device, server, and system in FIG. 1 is shown as a single device, multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection management system 150, between server farms 106 and computing environment 114, or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired or wireless networks may be implemented using routers, access points, bridges, gateways, or the like, to connect devices in the network 108. The networks 108 can be incorporated entirely within or can include an intranet, an extranet, or a combination thereof. In one example, communications between two or more systems or devices can be achieved by a secure communications protocol, such as secure sockets layer (SSL) or transport layer security (TLS). In addition, data or transactional details may be encrypted.

Some aspects may utilize the Internet of Things (IoT), where things (e.g., machines, devices, phones, sensors) can be connected to networks and the data from these things can be collected and processed within the things or external to the things. For example, the IoT can include sensors in many different devices, and high value analytics can be applied to identify hidden relationships and drive increased efficiencies. This can apply to both big data analytics and real-time (e.g., ESP) analytics.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The computing nodes in the communications grid 120 and the transmission network database system 118 may share the same processor hardware, such as processors that are located within computing environment 114.

In some examples, the computing environment 114, a network device 102, or both can implement one or more processes for automatically identifying geological tops. For example, the computing environment 114, a network device 102, or both can implement one or more versions of the processes discussed with respect to any of the figures.

Figure 2:
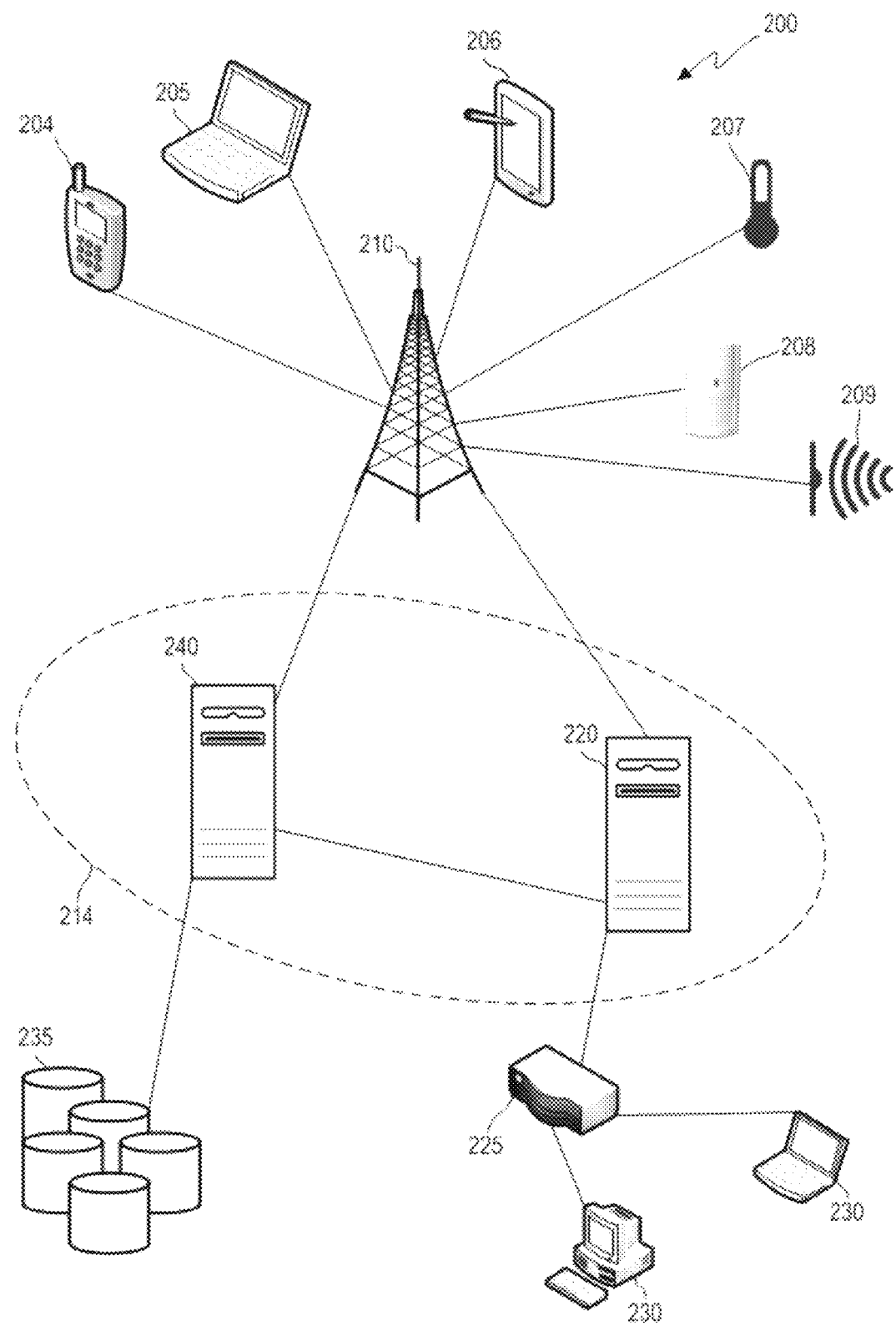
FIG. 2 depicts an example of devices that can communicate with each other over an exchange system and via a network according to some aspects.

FIG. 2 is an example of devices that can communicate with each other over an exchange system and via a network according to some aspects. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). In some examples, the communication can include times series data. The communication can be routed to another network device, such as network devices 205-209, via base station 210. The communication can also be routed to computing environment 214 via base station 210. In some examples, the network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems. The network devices may detect and record data related to the environment that it monitors, and transmit that data to computing environment 214.

The network devices 204-209 may also perform processing on data it collects before transmitting the data to the computing environment 214, or before deciding whether to transmit data to the computing environment 214. For example, network devices 204-209 may determine whether data collected meets certain rules, for example by comparing data or values calculated from the data and comparing that data to one or more thresholds. The network devices 204-209 may use this data or comparisons to determine if the data is to be transmitted to the computing environment 214 for further use or processing. In some examples, the network devices 204-209 can pre-process the data prior to transmitting the data to the computing environment 214. For example, the network devices 204-209 can reformat the data before transmitting the data to the computing environment 214 for further processing.

Computing environment 214 may include machines 220, 240. Although computing environment 214 is shown in FIG. 2 as having two machines 220, 240, computing environment 214 may have only one machine or may have more than two machines. The machines 220, 240 that make up computing environment 214 may include specialized computers, servers, or other machines that are configured to individually or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with client devices 230 via one or more routers 225. Computing environment 214 may collect, analyze or store data from or pertaining to communications, client device operations, client rules, or user-associated actions stored at one or more data stores 235. Such data may influence communication routing to the devices within computing environment 214, how data is stored or processed within computing environment 214, among other actions.

Notably, various other devices can further be used to influence communication routing or processing between devices within computing environment 214 and with devices outside of computing environment 214. For example, as shown in FIG. 2, computing environment 214 may include a machine 240 that is a web server. Computing environment 214 can retrieve data of interest, such as client information (e.g., product information, client rules, etc.), technical product details, news, blog posts, e-mails, forum posts, electronic documents, social media posts (e.g., Twitter™ posts or Facebook™ posts), time series data, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices 204-209 may receive data periodically and in real time from a web server or other source. Devices within computing environment 214 may also perform pre-analysis on data it receives to determine if the data received should be processed as part of an ongoing project. For example, as part of a project for automatically identifying geological tops based on well log records, the computing environment 214 can perform a pre-analysis of the well log records. The pre-analysis can include normalizing the data in the well log records or determining whether the data is in a correct format and, if not, reformatting the data into the correct format.

Figure 3:
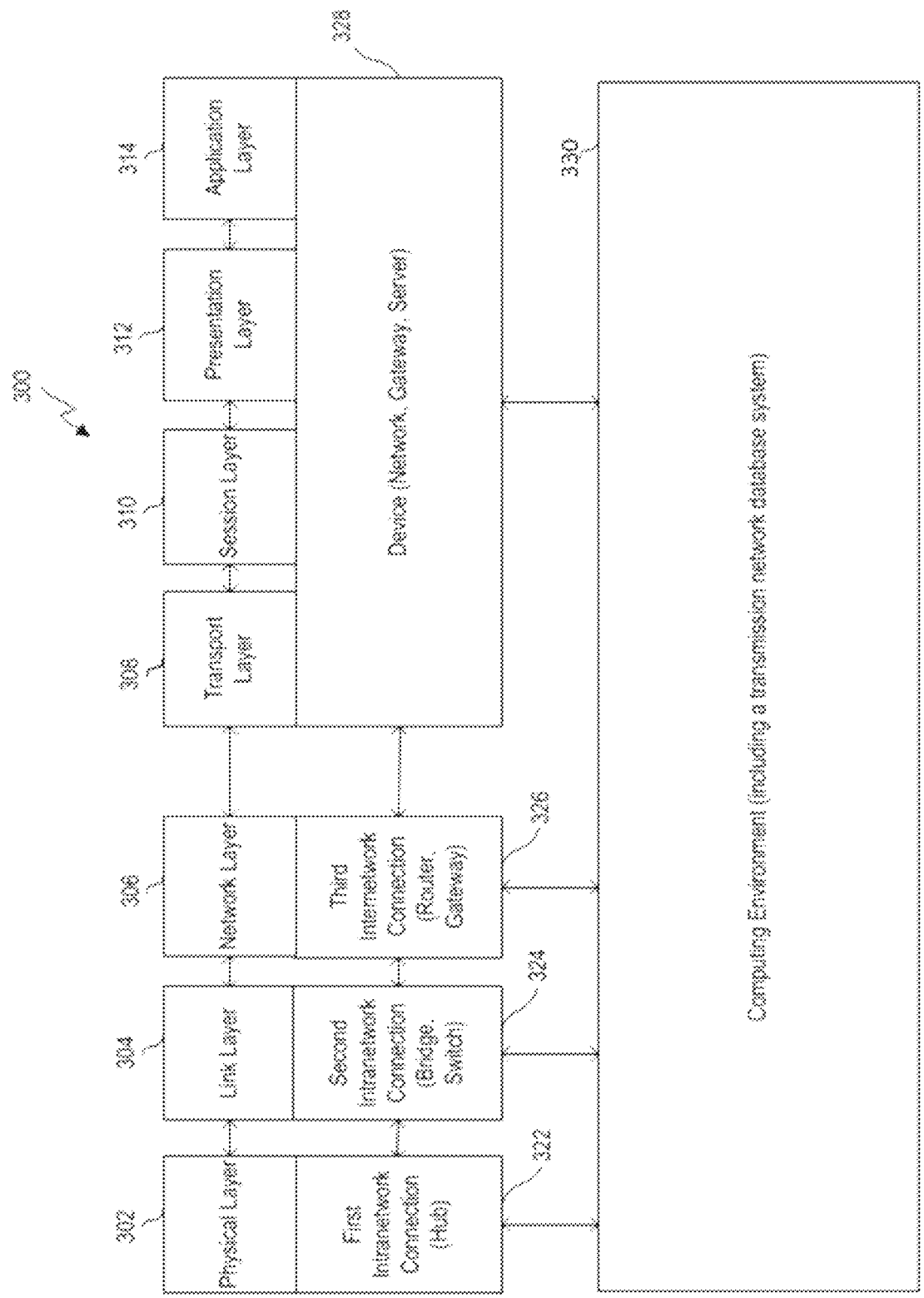
FIG. 3 depicts a block diagram of a model of an example of a communications protocol system according to some aspects.

FIG. 3 is a block diagram of a model of an example of a communications protocol system according to some aspects. More specifically, FIG. 3 identifies operation of a computing environment in an Open Systems Interaction model that corresponds to various connection components. The model 300 shows, for example, how a computing environment, such as computing environment (or computing environment 214 in FIG. 2) may communicate with other devices in its network, and control how communications between the computing environment and other devices are executed and under what conditions.

The model 300 can include layers 302-314. The layers 302-314 are arranged in a stack. Each layer in the stack serves the layer one level higher than it (except for the application layer, which is the highest layer), and is served by the layer one level below it (except for the physical layer 302, which is the lowest layer). The physical layer 302 is the lowest layer because it receives and transmits raw bites of data, and is the farthest layer from the user in a communications system. On the other hand, the application layer is the highest layer because it interacts directly with a software application.

As noted, the model 300 includes a physical layer 302. Physical layer 302 represents physical communication, and can define parameters of that physical communication. For example, such physical communication may come in the form of electrical, optical, or electromagnetic communications. Physical layer 302 also defines protocols that may control communications within a data transmission network.

Link layer 304 defines links and mechanisms used to transmit (e.g., move) data across a network. The link layer manages node-to-node communications, such as within a grid-computing environment. Link layer 304 can detect and correct errors (e.g., transmission errors in the physical layer 302). Link layer 304 can also include a media access control (MAC) layer and logical link control (LLC) layer.

Network layer 306 can define the protocol for routing within a network. In other words, the network layer coordinates transferring data across nodes in a same network (e.g., such as a grid-computing environment). Network layer 306 can also define the processes used to structure local addressing within the network.

Transport layer 308 can manage the transmission of data and the quality of the transmission or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt or format data based on data types known to be accepted by an application or network layer.

Application layer 314 interacts directly with software applications and end users, and manages communications between them. Application layer 314 can identify destinations, local resource states or availability or communication content or formatting using the applications.

For example, a communication link can be established between two devices on a network. One device can transmit an analog or digital representation of an electronic message that includes a data set to the other device. The other device can receive the analog or digital representation at the physical layer 302. The other device can transmit the data associated with the electronic message through the remaining layers 304-314. The application layer 314 can receive data associated with the electronic message. The application layer 314 can identify one or more applications, such as an application for automatically identifying geological tops, to which to transmit data associated with the electronic message. The application layer 314 can transmit the data to the identified application.

Intra-network connection components 322, 324 can operate in lower levels, such as physical layer 302 and link layer 304, respectively. For example, a hub can operate in the physical layer, a switch can operate in the physical layer, and a router can operate in the network layer. Inter-network connection components 326, 328 are shown to operate on higher levels, such as layers 306-314, For example, routers can operate in the network layer and network devices can operate in the transport, session, presentation, and application layers.

A computing environment 330 can interact with or operate on, in various examples, one, more, all or any of the various layers. For example, computing environment 330 can interact with a hub (e.g., via the link layer) to adjust which devices the hub communicates with. The physical layer 302 may be served by the link layer 304, so it may implement such data from the link layer 304. For example, the computing environment 330 may control which devices from which it can receive data. For example, if the computing environment 330 knows that a certain network device has turned off, broken, or otherwise become unavailable or unreliable, the computing environment 330 may instruct the hub to prevent any data from being transmitted to the computing environment 330 from that network device. Such a process may be beneficial to avoid receiving data that is inaccurate or that has been influenced by an uncontrolled environment. As another example, computing environment 330 can communicate with a bridge, switch, router or gateway and influence which device within the system (e.g., system 200) the component selects as a destination. In some examples, computing environment 330 can interact with various layers by exchanging communications with equipment operating on a particular layer by routing or modifying existing communications. In another example, such as in a grid-computing environment, a node may determine how data within the environment should be routed (e.g., which node should receive certain data) based on certain parameters or information provided by other layers within the model.

The computing environment 330 may be a part of a communications grid environment, the communications of which may be implemented as shown in the protocol of FIG. 3. For example, referring back to FIG. 2, one or more of machines 220 and 240 may be part of a communications grid-computing environment. A gridded computing environment may be employed in a distributed system with non-interactive workloads where data resides in memory on the machines, or compute nodes. In such an environment, analytic code, instead of a database management system, can control the processing performed by the nodes. Data is co-located by pre-distributing it to the grid nodes, and the analytic code on each node loads the local data into memory. Each node may be assigned a particular task, such as a portion of a processing project, or to organize or control other nodes within the grid. For example, each node may be assigned a portion of a processing task for automatically identifying geological tops.

Figure 4:
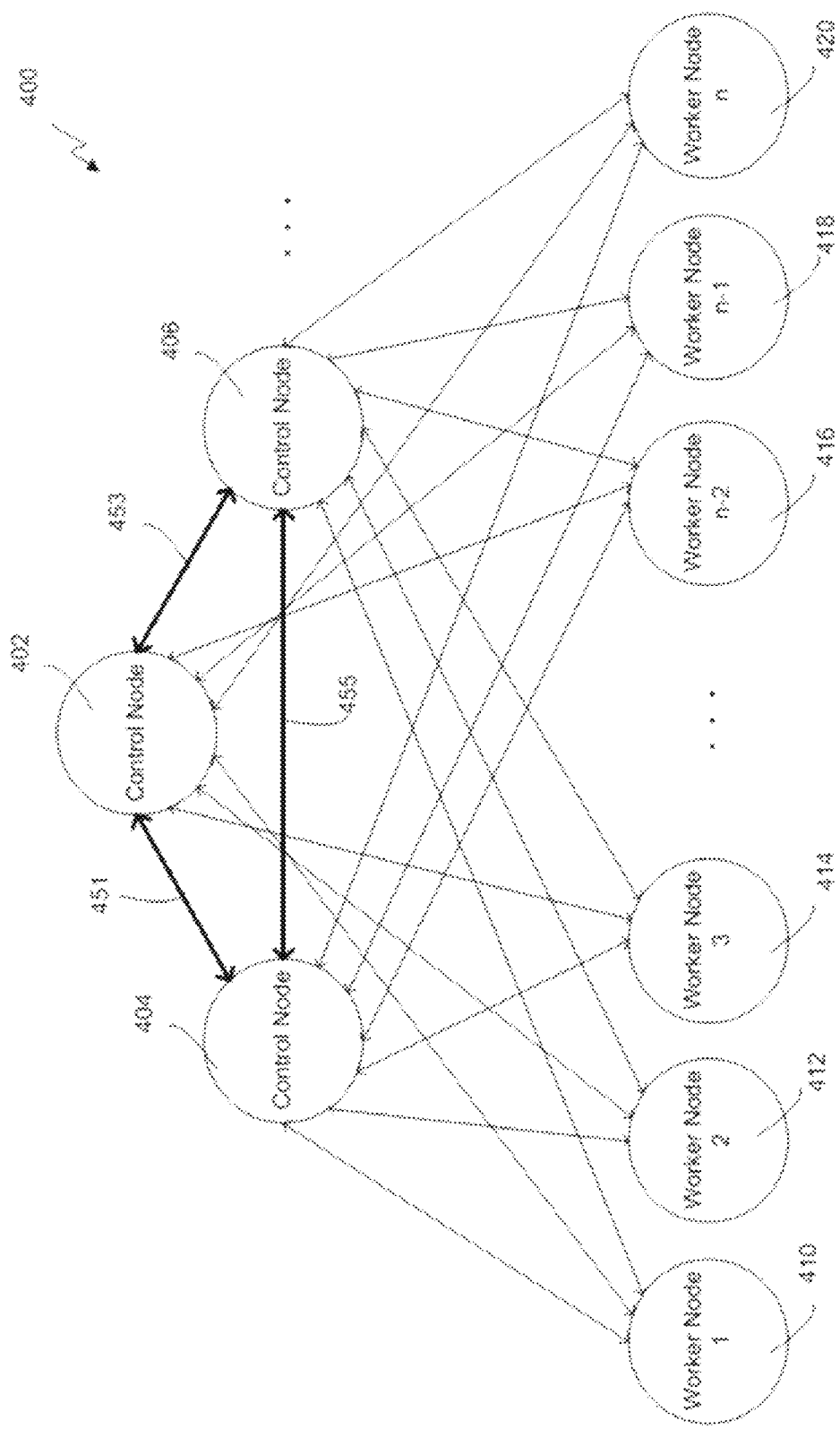
FIG. 4 depicts a hierarchical diagram of an example of a communications grid computing system including a variety of control and worker nodes according to some aspects.

FIG. 4 is a hierarchical diagram of an example of a communications grid computing system 400 including a variety of control and worker nodes according to some aspects. Communications grid computing system 400 includes three control nodes and one or more worker nodes. Communications grid computing system 400 includes control nodes 402, 404, and 406. The control nodes are communicatively connected via communication paths 451, 453, and 455. The control nodes 402-406 may transmit information (e.g., related to the communications grid or notifications) to and receive information from each other. Although communications grid computing system 400 is shown in FIG. 4 as including three control nodes, the communications grid may include more or less than three control nodes.

Communications grid computing system 400 (which can be referred to as a "communications grid") also includes one or more worker nodes. Shown in FIG. 4 are six worker nodes 410-420. Although FIG. 4 shows six worker nodes, a communications grid can include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid computing system 400 may be connected (wired or wirelessly, and directly or indirectly) to control nodes 402-406. Each worker node may receive information from the control nodes (e.g., an instruction to perform work on a project) and may transmit information to the control nodes (e.g., a result from work performed on a project). Furthermore, worker nodes may communicate with each other directly or indirectly. For example, worker nodes may transmit data between each other related to a job being performed or an individual task within a job being performed by that worker node. In some examples, worker nodes may not be connected (communicatively or otherwise) to certain other worker nodes. For example, a worker node 410 may only be able to communicate with a particular control node 402. The worker node 410 may be unable to communicate with other worker nodes 412-420 in the communications grid, even if the other worker nodes 412-420 are controlled by the same control node 402.

A control node 402-406 may connect with an external device with which the control node 402-406 may communicate (e.g., a communications grid user, such as a server or computer, may connect to a controller of the grid). For example, a server or computer may connect to control nodes 402-406 and may transmit a project or job to the node, such as a project or job related to automatically identifying geological tops. The project may include the data set. The data set may be of any size. Once the control node 402-406 receives such a project including a large data set, the control node may distribute the data set or projects related to the data set to be performed by worker nodes. Alternatively, for a project including a large data set, the data set may be receive or stored by a machine other than a control node 402-406 (e.g., a Hadoop data node).

Control nodes 402-406 can maintain knowledge of the status of the nodes in the grid (e.g., grid status information), accept work requests from clients, subdivide the work across worker nodes, and coordinate the worker nodes, among other responsibilities, Worker nodes 412-420 may accept work requests from a control node 402-406 and provide the control node with results of the work performed by the worker node. A grid may be started from a single node (e.g., a machine, computer, server, etc.). This first node may be assigned or may start as the primary control node 402 that will control any additional nodes that enter the grid.

When a project is submitted for execution (e.g., by a client or a controller of the grid) it may be assigned to a set of nodes. After the nodes are assigned to a project, a data structure (e.g., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node 402 receives a project, the primary control node may distribute portions of the project to its worker nodes for execution. For example, a project for automatically identifying geological tops can be initiated on communications grid computing system 400. A primary control node can control the work to be performed for the project in order to complete the project as requested or instructed. The primary control node may distribute work to the worker nodes 412-420 based on various factors, such as which subsets or portions of projects may be completed most efficiently and in the correct amount of time. For example, a worker node 412 may automatically identifying geological tops using at least a portion of data that is already local (e.g., stored on) the worker node. The primary control node also coordinates and processes the results of the work performed by each worker node 412-420 after each worker node 412-420 executes and completes its job. For example, the primary control node may receive a result from one or more worker nodes 412-420, and the primary control node may organize (e.g., collect and assemble) the results received and compile them to produce a complete result for the project received from the end user.

Any remaining control nodes, such as control nodes 404, 406, may be assigned as backup control nodes for the project. In an example, backup control nodes may not control any portion of the project. Instead, backup control nodes may serve as a backup for the primary control node and take over as primary control node if the primary control node were to fail. If a communications grid were to include only a single control node 402, and the control node 402 were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes 402-406, including a backup control node, may be beneficial.

In some examples, the primary control node may open a pair of listening sockets to add another node or machine to the grid. A socket may be used to accept work requests from clients, and the second socket may be used to accept connections from other grid nodes. The primary control node may be provided with a list of other nodes (e.g., other machines, computers, servers, etc.) that can participate in the grid, and the role that each node can fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it can check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. But, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404, 406 (and, for example, to other control or worker nodes 412-420 within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes 410-420 in the communications grid, unique identifiers of the worker nodes 410-420, or their relationships with the primary control node 402) and the status of a project (including, for example, the status of each worker node's portion of the project), The snapshot may also include analysis or results received from worker nodes 410-420 in the communications grid. The backup control nodes 404, 406 may receive and store the backup data received from the primary control node 402. The backup control nodes 404, 406 may transmit a request for such a snapshot (or other information) from the primary control node 402, or the primary control node 402 may send such information periodically to the backup control nodes 404, 406.

As noted, the backup data may allow a backup control node 404, 406 to take over as primary control node if the primary control node 402 fails without requiring the communications grid to start the project over from scratch. If the primary control node 402 fails, the backup control node 404, 406 that will take over as primary control node may retrieve the most recent version of the snapshot received from the primary control node 402 and use the snapshot to continue the project from the stage of the project indicated by the backup data. This may prevent failure of the project as a whole.

A backup control node 404, 406 may use various methods to determine that the primary control node 402 has failed. In one example of such a method, the primary control node 402 may transmit (e.g., periodically) a communication to the backup control node 404, 406 that indicates that the primary control node 402 is working and has not failed, such as a heartbeat communication. The backup control node 404, 406 may determine that the primary control node 402 has failed if the backup control node has not received a heartbeat communication for a certain predetermined period of time. Alternatively, a backup control node 404, 406 may also receive a communication from the primary control node 402 itself (before it failed) or from a worker node 410-420 that the primary control node 402 has failed, for example because the primary control node 402 has failed to communicate with the worker node 410-420.

Different methods may be performed to determine which backup control node of a set of backup control nodes (e.g., backup control nodes 404, 406) can take over for failed primary control node 402 and become the new primary control node. For example, the new primary control node may be chosen based on a ranking or "hierarchy" of backup control nodes based on their unique identifiers. In an alternative example, a backup control node may be assigned to be the new primary control node by another device in the communications grid or from an external device (e.g., a system infrastructure or an end user, such as a server or computer, controlling the communications grid). In another alternative example, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative example, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed. In some examples, a communications grid computing system 400 can be used in automatically identifying geological tops.

Figure 5:
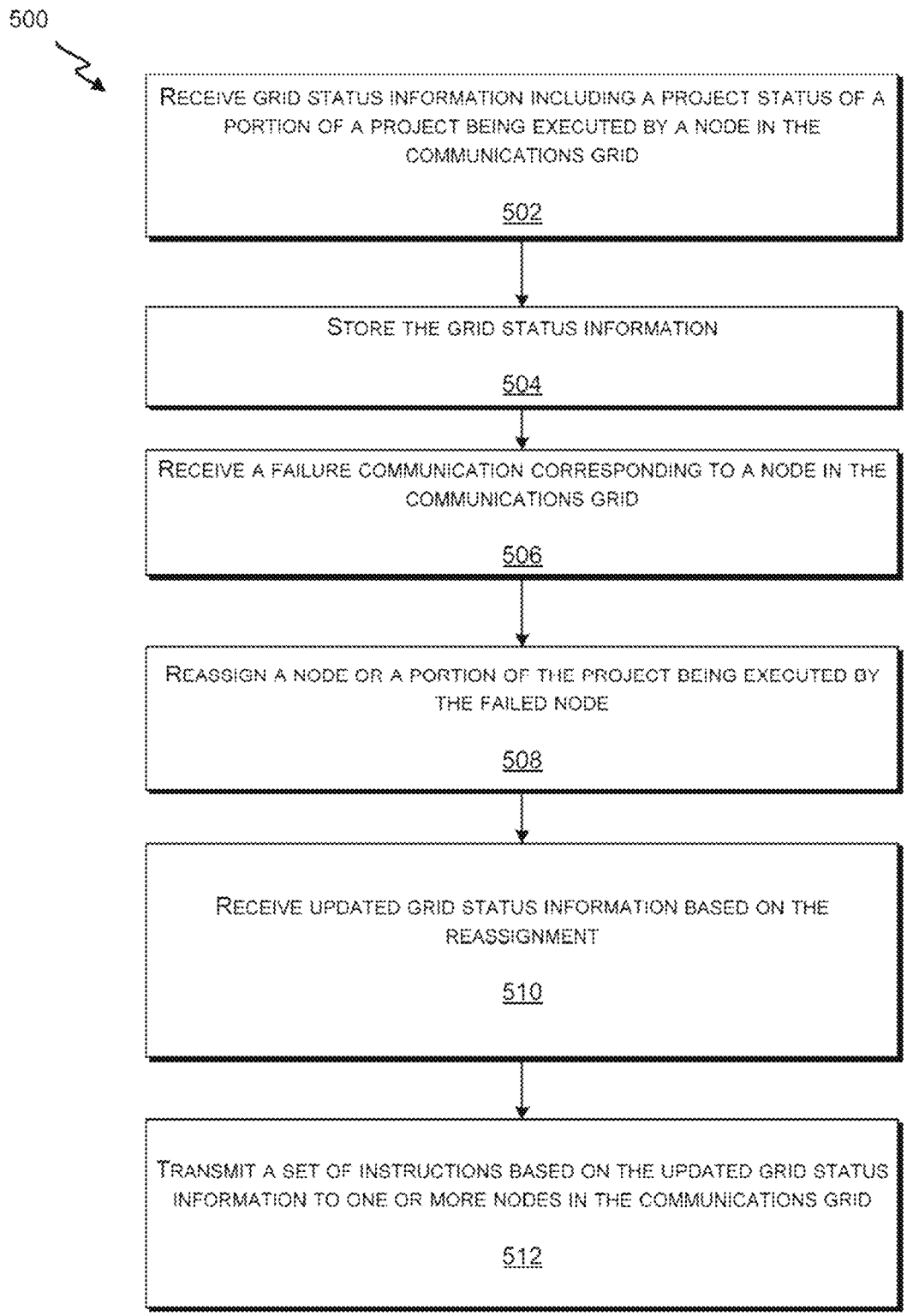
FIG. 5 depicts a flow chart of an example of a process for adjusting a communications grid or a work project in a communications grid after a failure of a node according to some aspects.

FIG. 5 is a flow chart of an example of a process for adjusting a communications grid or a work project in a communications grid after a failure of a node according to some aspects. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 505. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
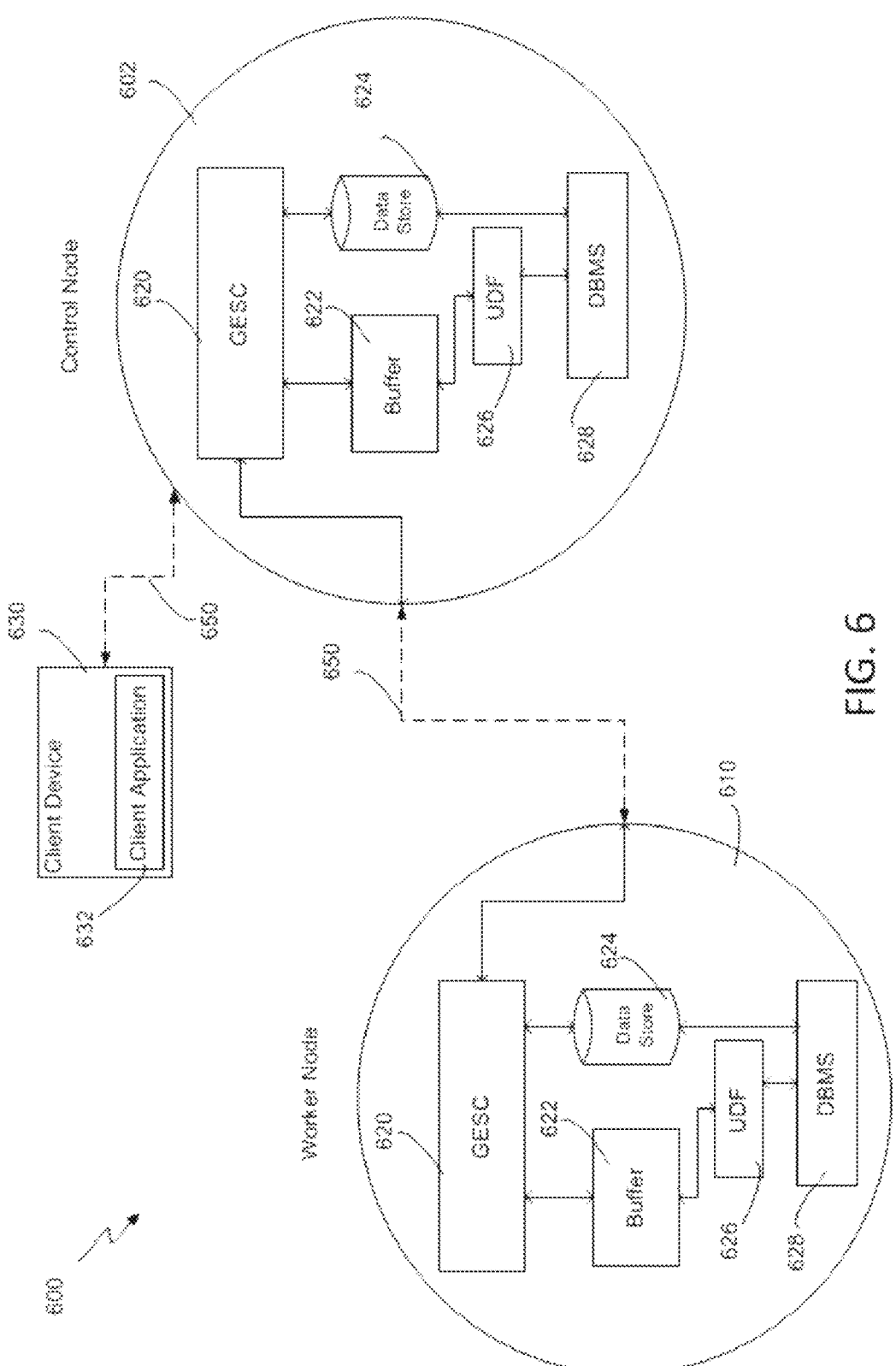
FIG. 6 depicts a block diagram of a portion of a communications grid computing system including a control node and a worker node according to some aspects.

FIG. 6 is a block diagram of a portion of a communications grid computing system 600 including a control node and a worker node according to some aspects, Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via communication path 650.

Similar to in FIG. 4, communications grid computing system (or just "communications grid") 600 includes data processing nodes (control node 602 and worker node 610). Nodes 602 and 610 comprise multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain examples, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 610 may be connected via a network, such as network 108 shown in FIG. 1. Therefore, nodes 602 and 610 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DMBS 628 may control the creation, maintenance, and use of database or data structure (not shown) within nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
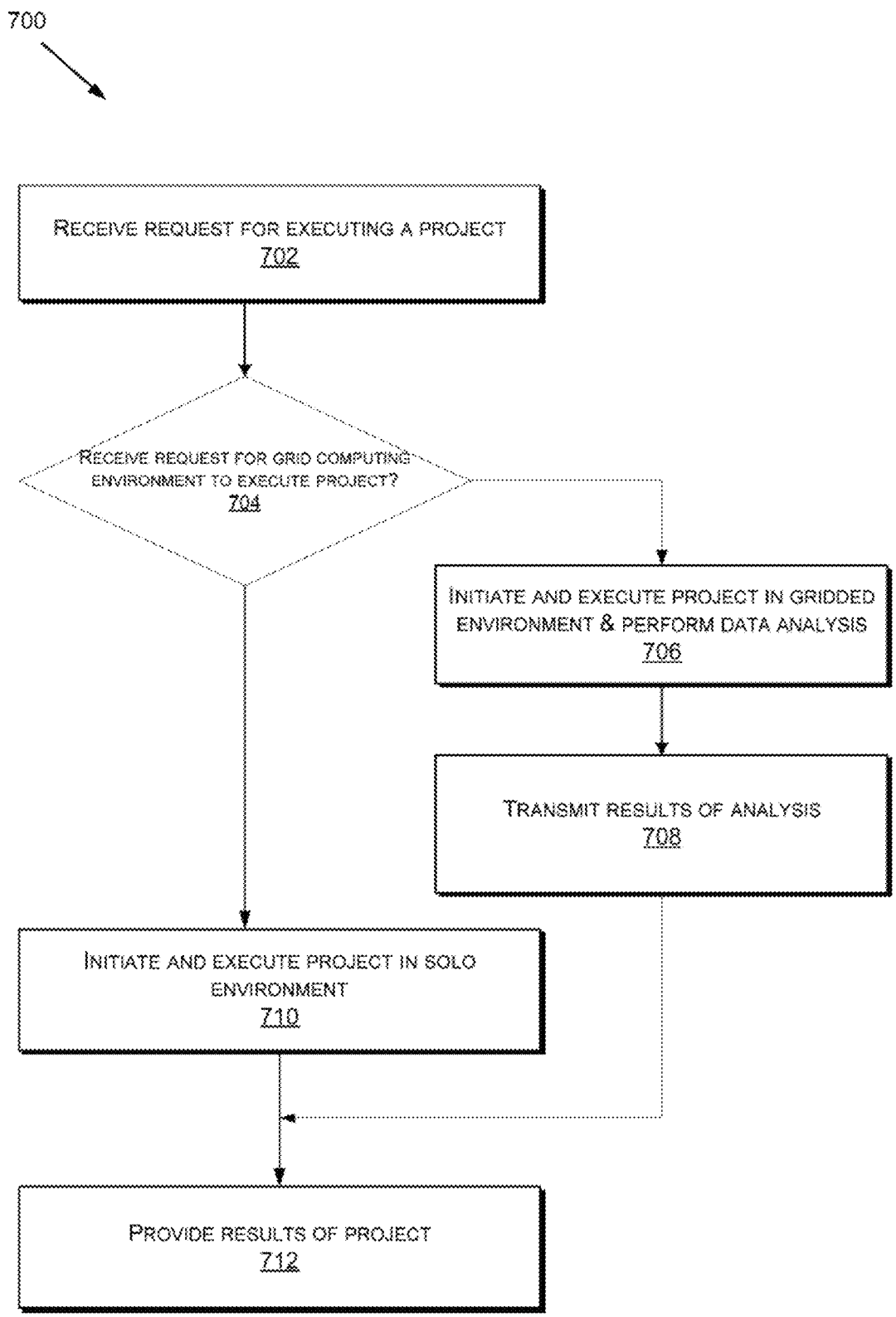
FIG. 7 depicts a flow chart of an example of a process for executing a data analysis or processing project according to some aspects.

FIG. 7 is a flow chart of an example of a process for executing a data analysis or a processing project according to some aspects. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024*a-c*, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

Figure 8:
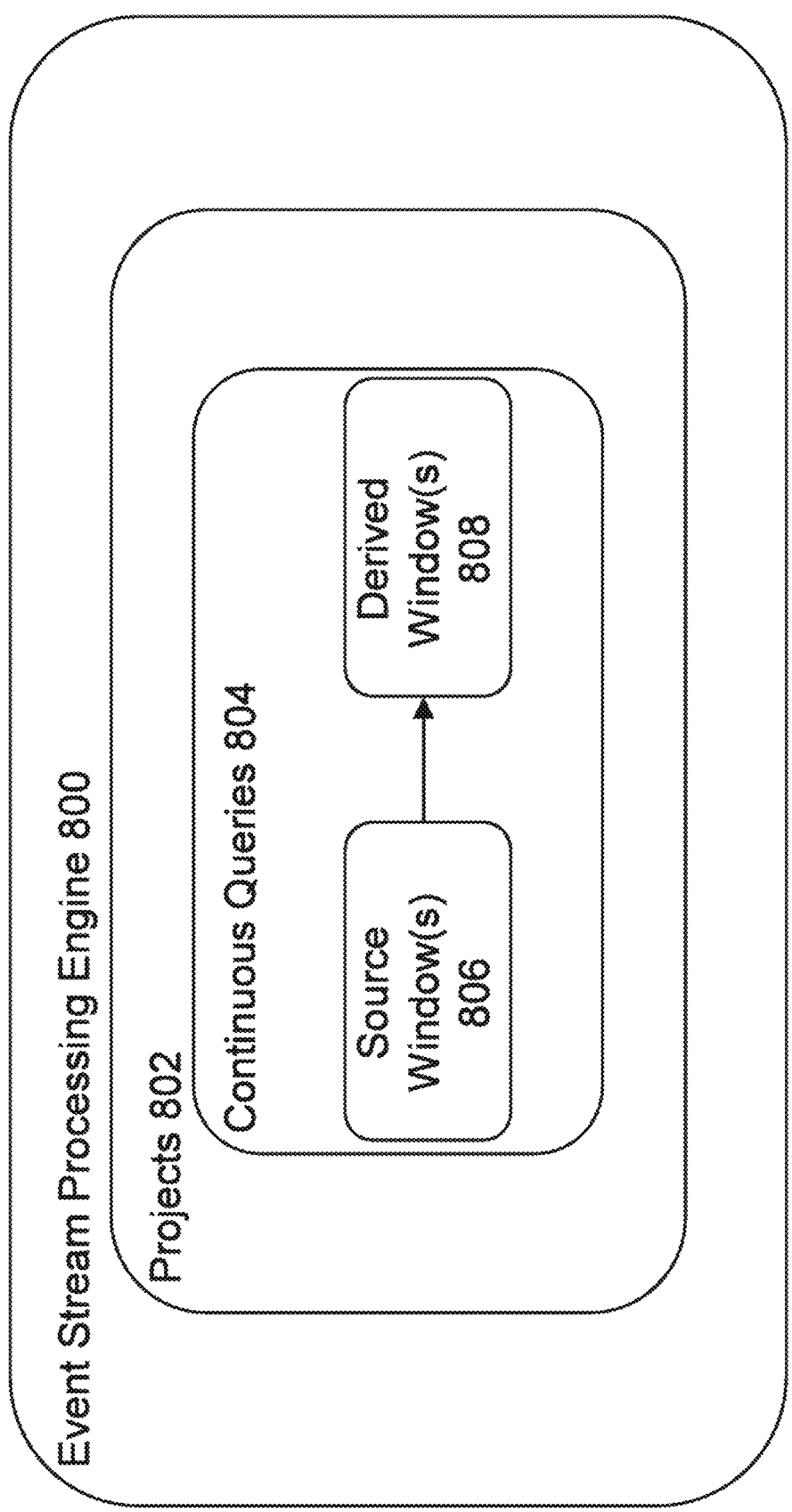
FIG. 8 depicts a block diagram including components of n Event Stream Processing Engine (ESPE) according to some aspects.

FIG. 8 is a block diagram including components of an Event Stream Processing Engine (ESPE) according to some aspects. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

Figure 9:
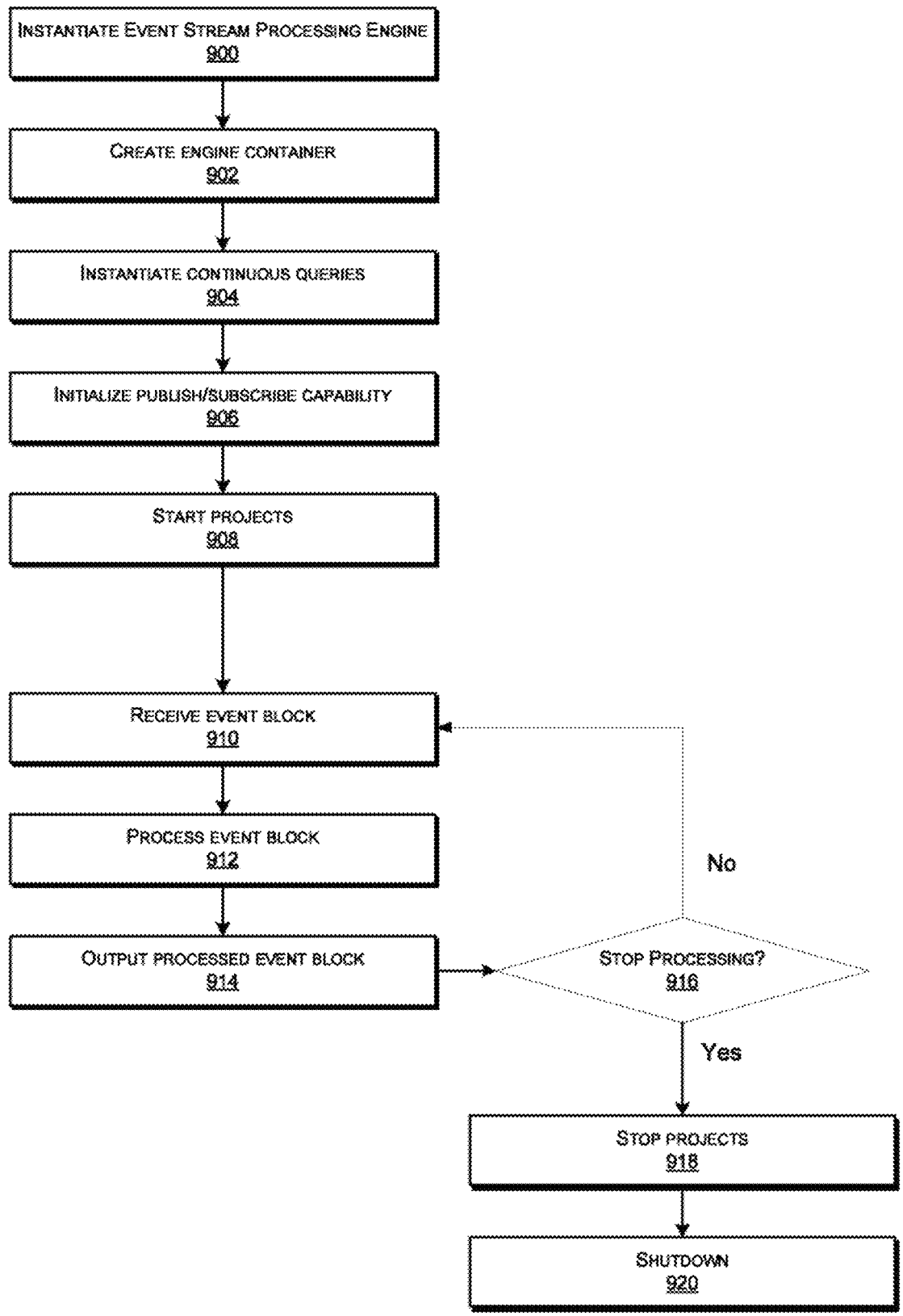
FIG. 9 depicts a flow chart of an example of a process including operations performed by an event stream processing engine according to some aspects.

FIG. 9 is a flow chart of an example of a process including operations performed by an event stream processing engine according to some aspects. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. Various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

Figure 10:
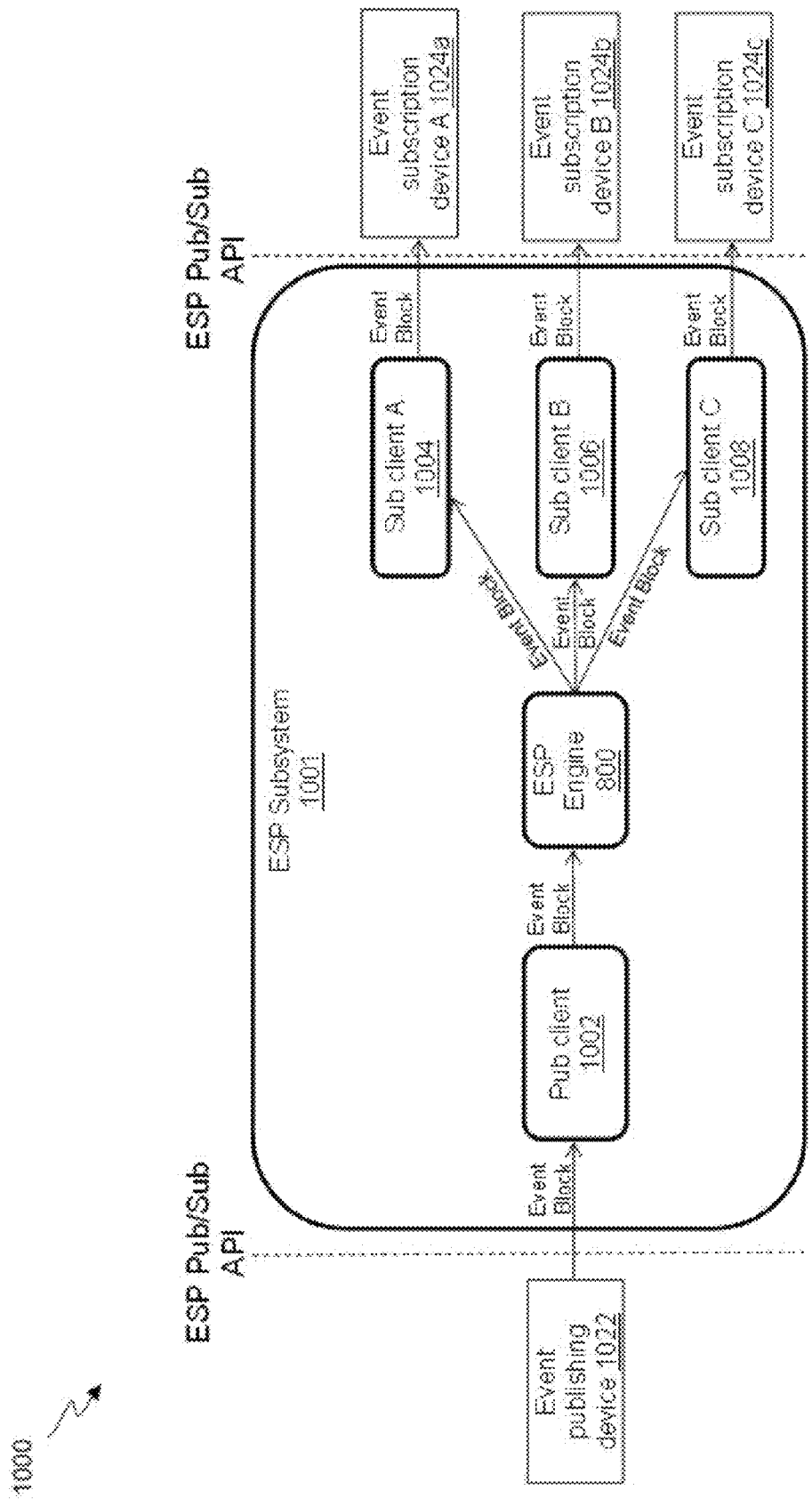
FIG. 10 depicts a block diagram of an ESP system interfacing between a publishing device and multiple event subscribing devices according to some aspects.

FIG. 10 is a block diagram of an ESP system 1000 interfacing between publishing device 1022 and event subscription devices 1024a-c according to some aspects. ESP system 1000 may include ESP subsystem 1001, publishing device 1022, an event subscription device A 1024a, an event subscription device B 1024b, and an event subscription device C 1024c. Input event streams are output to ESP subsystem 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscription device A 1024a, event subscription device B 1024b, and event subscription device C 1024c. ESP system 1000 may include a greater or a fewer number of event subscription devices of event subscription devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscription device A 1024a, event subscription device B 1024b, and event subscription device C 1024c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscription device A 1024a, event subscription device B 1024b, and event subscription device G 1024c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the publishing device 1022.

ESP subsystem 1001 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscription device A 1024a using the publish/subscribe API. Subscribing client B 1006 may be started by an event subscription application B executing at event subscription device B 1024b using the publish/subscribe API. Subscribing client C 1008 may be started by an event subscription application C executing at event subscription device C 1024c using the publish/subscribe API An event block object containing one or more event objects is injected into a source window of the one or more source windows 806 from an instance of an event publishing application on publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024a, event subscription device B 1024b, and event subscription device C 1024c. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscription devices 1024a-c. For example, subscribing client A 1004, subscribing client B 1006, and subscribing client C 1008 may send the received event block object to event subscription device A 1024a, event subscription device B 1024b, and event subscription device C 1024c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some examples, big data is processed for an analytics project after the data is received and stored. In other examples, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internee of things, such as devices within a home automation network. However, such data may be collected from a variety of different resources in a variety of different environments. In any such situation, embodiments of the present technology allow for real-time processing of such data.

Aspects of the present disclosure provide technical solutions to technical problems, such as computing problems that arise when an ESP device fails which results in a complete service interruption and potentially significant data loss. The data loss can be catastrophic when the streamed data is supporting mission critical operations, such as those in support of an ongoing manufacturing or drilling operation. An example of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, one or more processors and one or more computer-readable mediums operably coupled to the one or more processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
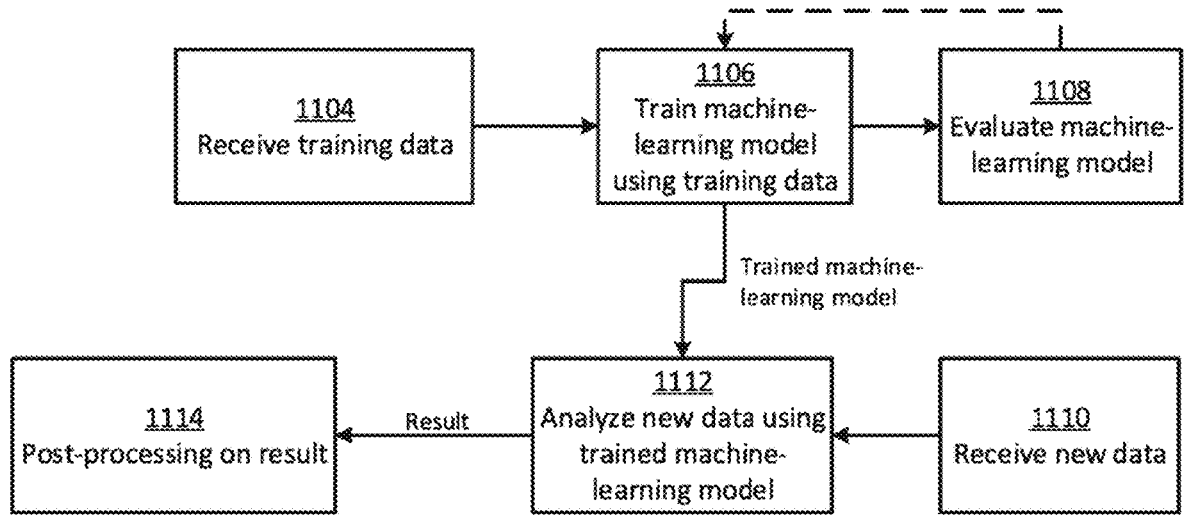
FIG. 11 depicts a flow chart of an example of a process for generating and using a machine learning model according to some aspects.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SASS Enterprise Miner, SAS® Rapid Predictive Modeler, and SASS Model Manager, SAS Cloud Analytic Services (CAS)®, SAS Viya® of all which are by SAS Institute Inc. of Gary, N.C.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1104, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1106, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1108, the machine-learning model is evaluated. An evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 1106, where the machine-learning model can be further trained using additional training data or otherwise modified to improve accuracy. If the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
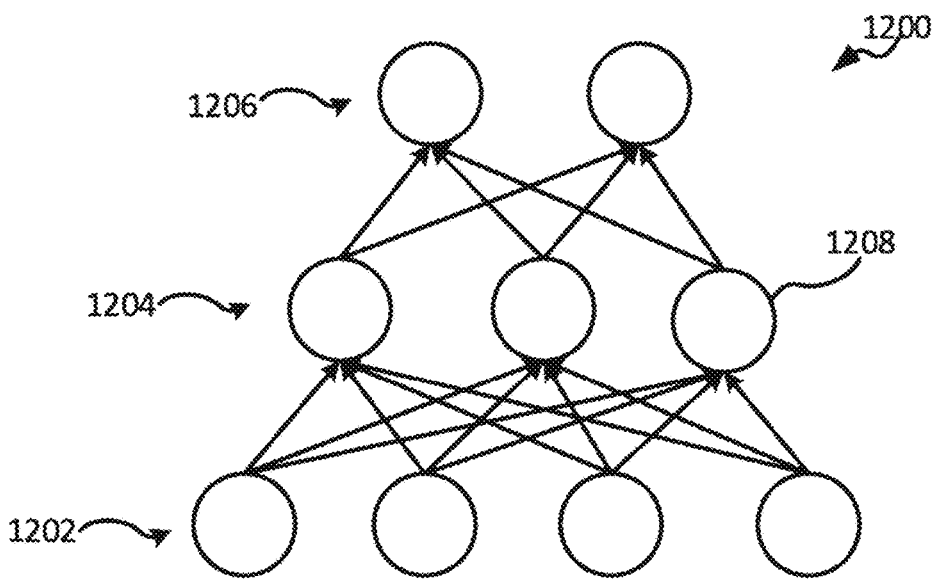
FIG. 12 depicts a node-link diagram of an example of a neural network according to some aspects.

A more specific example of a machine-learning model is the neural network 1200 shown in FIG. 12. The neural network 1200 is represented as multiple layers of interconnected neurons, such as neuron 1208, that can exchange data between one another. The layers include an input layer 1202 for receiving input data, a hidden layer 1204, and an output layer 1206 for providing a result. The hidden layer 1204 is referred to as hidden because it may not be directly observable or have its input directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons and connections between the neurons can have numeric weights, which can be tuned during training. For example, training data can be provided to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 and a desired output of the neural network 1200. Based on the gradient, one or more numeric weights of the neural network 1200 can be updated to reduce the difference, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, every neuron only propagates an output value to a subsequent layer of the neural network 1200. For example, data may only move one direction (forward) from one neuron to the next neuron in a feed-forward neural network.

In other examples, the neural network 1200 is a recurrent neural network. A recurrent neural network can include one or more feedback loops, allowing data to propagate in both forward and backward through the neural network 1200. This can allow for information to persist within the neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer of the neural network 1200. Each subsequent layer of the neural network 1200 can repeat this process until the neural network 1200 outputs a final result at the output layer 1206. For example, the neural network 1200 can receive a vector of numbers as an input at the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the following equation:

$$y=\max(x,0)$$

where y is the output and x is an input value from the weighted vector. The transformed output can be supplied to a subsequent layer, such as the hidden layer 1204, of the neural network 1200. The subsequent layer of the neural network 1200 can receive the transformed output, multiply the transformed output by a matrix of numeric weights and a nonlinearity, and provide the result to yet another layer of the neural network 1200. This process continues until the neural network 1200 outputs a final result at the output layer 1206.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and quickly executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. Furthermore, these processors may also be employed in heterogeneous computing architectures with a number of and a variety of different types of cores, engines, nodes, and/or layers to achieve various energy efficiencies, thermal processing mitigation, processing speed improvements, data communication speed improvements, and/or data efficiency targets and improvements throughout various parts of the system when compared to a homogeneous computing architecture that employs CPUs for general purpose computing.

Figure 13:
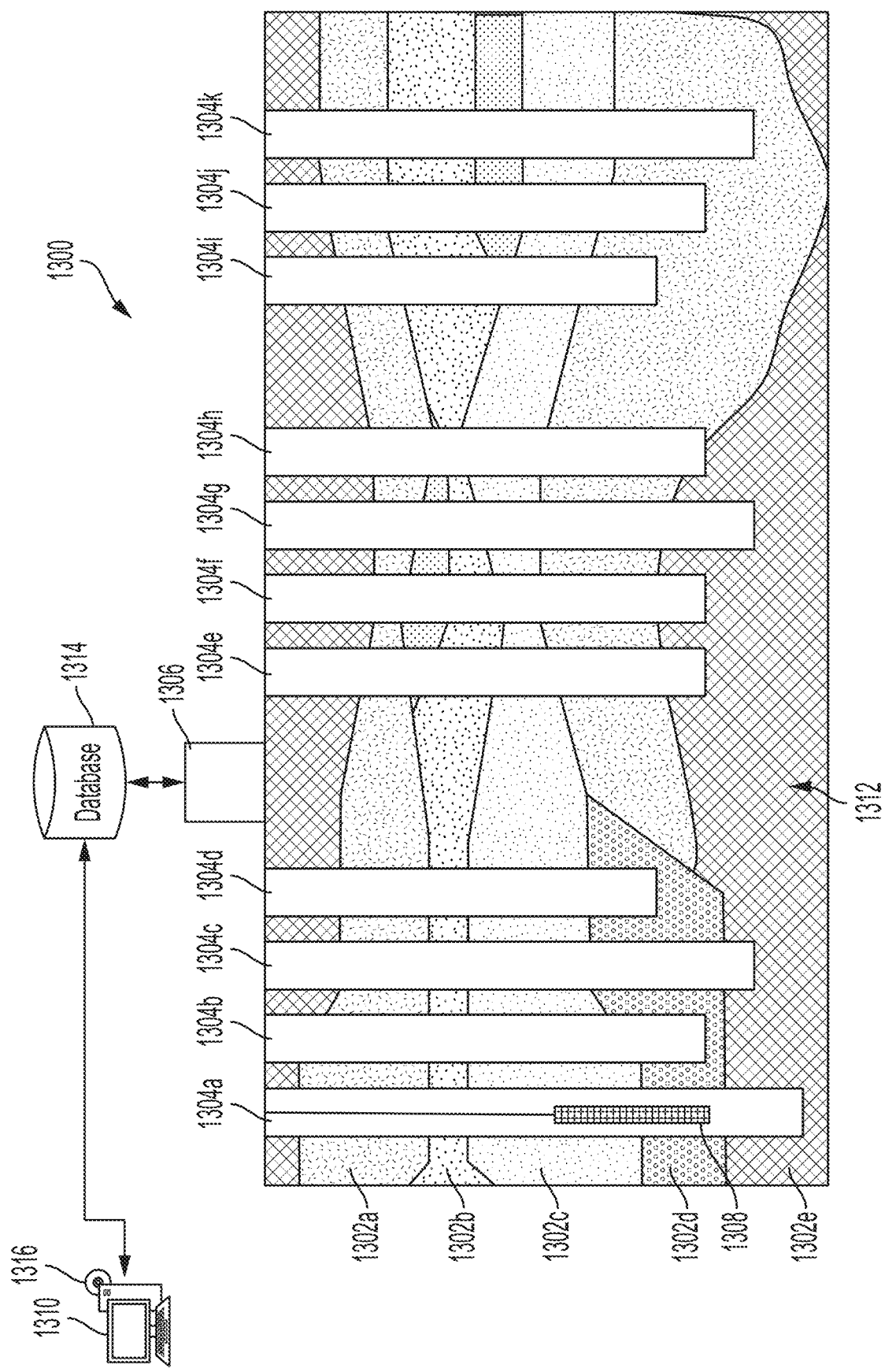
FIG. 13 depicts an example of a well system according to some aspects.

FIG. 13 depicts an example of a well system 1300 according to some aspects of the present disclosure. The well system 1300 includes wellbores 1304a-k drilled through geological layers 1302a-e (e.g., strata) of a subterranean formation 1312. The geological layers 1302a-e can include different materials and vary in thickness and shape. Examples of the different materials may include rock or soil; natural resources like oil, water, and gas; etc.

One or more well tools, such as well tool 1308, can be deployed into each of the wellbores 1304a-k to generate corresponding well log records. An example of the well tools can be logging tools. The well tools can include measurement equipment for measuring the properties of the rocks, fluid, or other contents of the geological layers 1302a-e. For example, the well tool 1308 can measure the electrical, acoustic, radioactive, electromagnetic, or pressure properties of the geological regions proximate to wellbore 1304a. The well tools can store the measurements as one or more well log records. Separate well log records can be generated for each of the wellbores 1304a-k.

The well tools can electronically transmit the well log records to a data acquisition device 1306, which may be located offsite or onsite as shown in FIG. 13. The well tools can electronically transmit the well log records to the data acquisition device 1306 using a wired or wireless interface. The transmission may occur over one or more networks, such as a local area network or the Internet. The data acquisition device 1306 can receive (e.g., collect), normalize, and store the well log records associated with the various wellbores 1304a-k. For example, the data acquisition device 1306 can store the well log records in one or more databases 1314.

A computing system 1310, which may be located onsite or offsite, can obtain the well log records. The computing system 1310 may be similar to any of the computing devices or systems described above. The computing system 1310 can obtain the well log records from the database(s) 1314, the data acquisition device 1306, or from any from other suitable source. After obtaining the well log records, the computing system 1310 can execute automatic correlation software 1316 to implement an automatic correlation process using machine-learning models, as described below.

In some examples, the automatic correlation process can involve assigning the wellbores 1304a-k into different clusters by executing a clustering process. Examples of the clustering process can include K-means clustering, dynamic time warping, and K nearest neighbor (KNN) clustering. The clustering process can cluster any number and combination of wellbores into any number and combination of well clusters based on various numbers and combinations of criteria. For example, the clustering process may group the wellbores 1304a-k together based on their geographical distances to one another, based on the statistical similarities between their well log records, or both. To determine a statistical similarity between a pair of well log records, it will first be appreciated that each well log record can be a numerical matrix with different measurements as columns for each depth (row). A statistical distance can therefore be determined for the pair of well log records based on a modified Frobenius norm that measures a numerical distance between the two matrices. That measure can then be converted into a similarity measure, which indicates the statistical similarity between the two well log records. As a result of the clustering process, wellbores 1304a-d may be grouped together into a first well cluster (e.g., because they are geographically and statistically close to one another and may therefore penetrate regions of the subterranean formation 1312 having similar geological properties), wellbores 1304e-h may be grouped together into a second well cluster, and wellbores 1304i-k may be grouped together into a third well cluster.

Once the wellbores 1304a-k are assigned to well clusters, the computing system 1310 can execute a training phase of the automatic correlation process that can involve training a respective machine-learning model for each well cluster. The machine-learning model for a given well cluster can be trained based on a respective set of training data constructed from training logs from that well cluster. The training logs can be well log records that are annotated (e.g. manually annotated by a geologist) with labels indicating the geological tops of geological layers and the types of the geological layers.

Once the machine-leaning model for a given well cluster is trained, the computing system 1310 can execute an identification phase of the automatic correlation process. The identification phase can involve providing the target well log records from the well cluster as input to the trained machine-learning model to receive outputs therefrom indicating the tops and types of geological layers in the target logs. In particular, each trained machine-learning model can be executed to automatically generate an output indicating the type of geological layer present at each depth in a target log, Consecutive depths of the same layer type can represent a single geographical layer. Interfaces (e.g., boundaries) between adjacent geographical layers can represent a geological top. Therefore, the computing system 1310 can use the outputs from the trained machine-learning model to identify the tops and types of the geological layers in the target logs. This can be a more rapid, objective, consistent, and accurate way to identify the tops and types of geological layers than alternative approaches. The tops and types of the geological layers can then be provided to other software or computing systems, or to a geologist, for subsequent use in relation to extracting hydrocarbons or other natural resources from the subterranean formation 1312.

Figure 14:
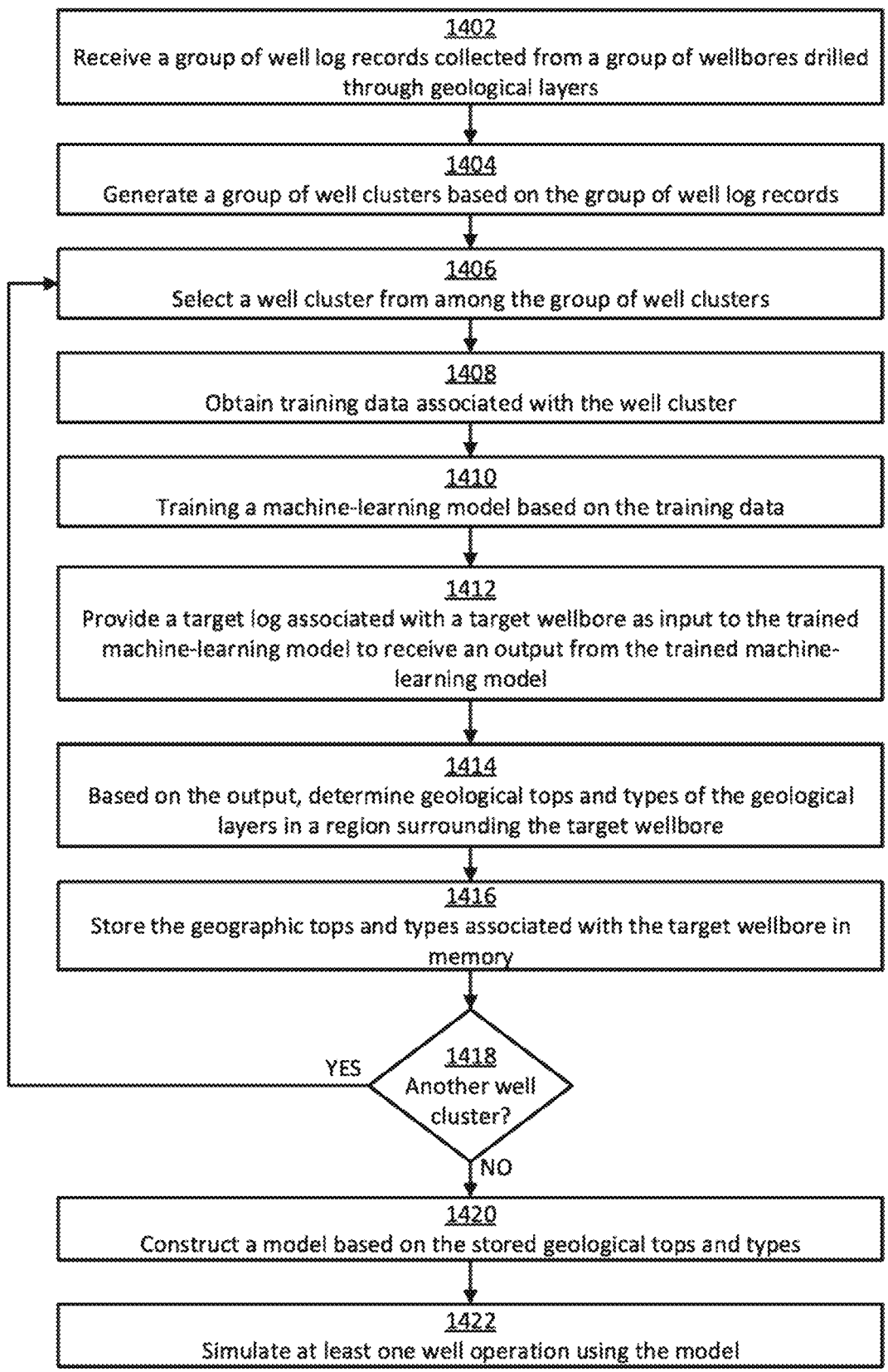
FIG. 14 depicts a flow chart of an example of a process for automatically identifying tops of geological layers according to some aspects.

FIG. 14 is a flow chart of an example of a process for automatically identifying tops of geological layers according to some aspects of the present disclosure. Other examples may involve more operations, fewer operations, different operations, or a different order of the operations shown in FIG. 14. The operations of FIG. 14 are described below with reference to the components of FIG. 13 described above.

In operation 1402, a computing system 1310 receives a group of well log records collected from a group of wellbores 1304a-k drilled through geological layers 1302a-e. The group of well log records can include any number of well log records collected from any number of wellbores. The computing system 1310 can receive the group of well log records from a database 1314, a data acquisition device 1306, or any other suitable source.

In operation 1404, the computing system 1310 generates a group of well clusters based on the group of well log records. This clustering process can be used to break data for a large region with complex and non-uniform geology into clusters containing wellbores with similar surrounding geology.

To generate the group of well clusters, the computing system 1310 can execute an automated clustering process. In some examples, the automated clustering process can be a modified spectral clustering process. The automated clustering process can group the wellbores 1304a-k into the well clusters based on any suitable criteria, such as the geographical distances (e.g., physical distances in real space) between the wellbores, the statistical similarities between the corresponding well log records, or both of these. An example of the clustering process is described in greater detail later on with respect to FIG. 17.

In operation 1406, the computing system 1310 selects a well cluster from among the group of well clusters. This may be a random selection or an ordered selection (e.g., well clusters are selected in a predesignated order).

In operation 1408, the computing system 1310 obtains training data associated with the well cluster. The computing system 1310 can obtain the training data from any suitable source, such as a database or a remote computing device.

The training data can be derived from one or more training logs associated with the well cluster. In some examples, a geologist can manually select the training logs based on one or more predefined criteria. For example, the geologist can identify one or more wellbores in the well cluster that (i) start shallow and end deep to cover the largest depth range, (ii) are close to the statistical center of the well cluster, (iii) together intersect the full set of geological layers to be identified in relation to this well cluster, or (iv) any combination of these. The full set of geological layers can include all of the geological layers that are to be identifiable by the trained machine-learning model. Selecting wellbores that intersect the full set of geological layers can improve the accuracy of the trained model because, if one or more geological layers are missing from the training data, the model may be unable to identify those layers once it is trained. Having identified the training wellbores, the geologist can then select the well log records corresponding to those wellbores as the training logs. In other examples, the training logs can be automatically selected by a computer using any suitable technique. For example, the training logs can be automatically selected using randomized selection or based on one or more of the above predefined criteria.

After the training logs have been selected, the geologist can then review and annotate the training logs with various information, such as the tops and types of geological layers. The training data can then be constructed from the annotated training logs. For example, the training data can be, or can include, the annotated training logs. Thereafter, the training data can be supplied to the computing system 1310 for use in subsequent operations.

In operation 1410, the computing system 1310 trains a machine-learning model based on the training data, Training the machine-learning model may involve transforming the machine-learning model from an untrained state into a trained state, for example in which weights have been determined and applied to nodes or connections of the machine-learning model.

In operation 1412, the computing system 1310 provides a target log as input to the trained machine-learning model. The target log can be a well log record obtained from a target wellbore in the well cluster, where the target log was not used to create the training data. Based on the input, the trained machine-learning model can generate one or more outputs indicating the tops and types of the geological layers in the region (e.g., geological region) surrounding the target wellbore.

Figure 15:
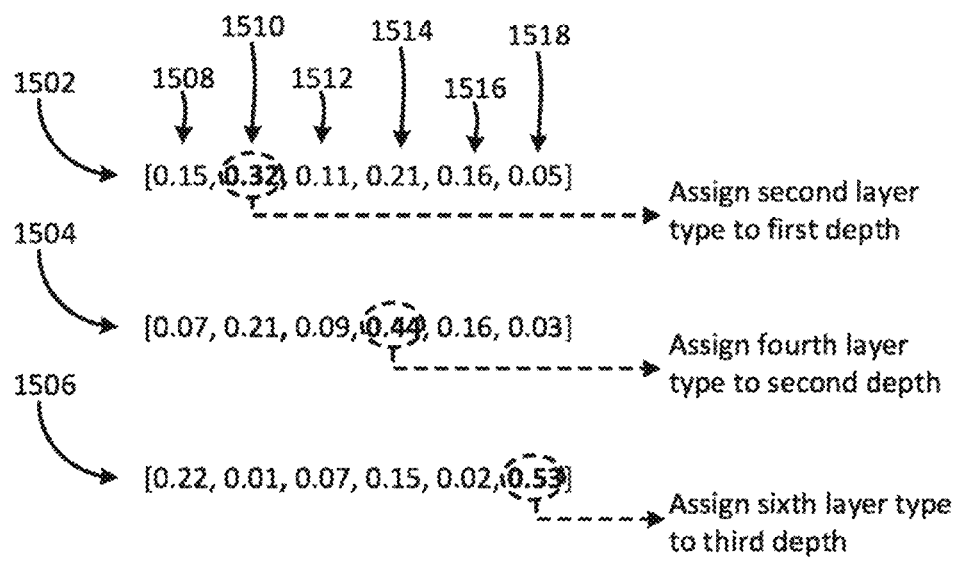
FIG. 15 depicts an example of outputs from a trained machine-learning model according to some aspects.

In some examples, the output(s) can indicate the type of geological layer present at each depth in the target log. For example, there can be N candidate types of geological layers present at a particular depth. So for each depth in the target log, the trained machine-learning model can output N corresponding probabilities. Each probability can indicate the likelihood that the geological layer present at the target depth is one of the N candidate types. An example of this is shown in FIG. 15. In FIG. 15, there are three arrays 1502-1506, Array 1502 corresponds to a first depth in a target log, array 1504 corresponds to a second depth in the target log, and array 1506 corresponds to a third depth in the target log. The trained machine-learning model can generate and outputs these arrays. Each of the arrays 1502-1506 includes a list of elements 1508-1518, where each element in a given array is a probability that the corresponding depth is associated with a particular layer type. For example, the first element 1508 is a first probability that the first depth corresponds to a geological layer of a first type, the second element 1510 is a second probability that the first depth corresponds to a geological layer of a second type, the third element 1512 is a third probability that the first depth corresponds to a geological layer of a third type, etc. Examples of the layer types can include various types of limestone, shale, sandstone, and composites.

Referring back to FIG. 14, in operation 1414 the computing system 1310 uses the outputs from the trained machine-learning model to determine the geological tops and types of the geological layers in the region surrounding the target wellbore. In particular, the computing system 1310 can analyze the outputs from the trained machine-learning model to determine the tops and types of the geological layers associated with the target log.

For example, the computing system 1310 can determine a layer type corresponding to each measured depth in the target log by analyzing the probabilities output by the trained machine-learning model in relation to the depth. In particular, the computing system 1310 can analyze the array of probabilities corresponding to the depth, determine the highest probability value in the array, determine the layer type corresponding to the highest probability, and assign that layer type to the depth. The computing system 1310 can repeat this process for each depth in the target log, for example to assign layer types to some or all measured depths in the target log. One example of this process is shown in FIG. 15. As shown in FIG. 15, the highest probability value in each array is shown bolded. The computing system 1310 can determine the highest probability value in each of the arrays 1502-1506, determine the layer type corresponding to the highest probability value, and assign that layer type to the corresponding depth. Using this process, the second layer type would be assigned to the first depth (corresponding to array 1502), the fourth layer type would be assigned to the second depth (corresponding to array 1504), and the sixth layer type would be assigned to the third depth (corresponding to array 1506).

Once the layer types are determined and assigned to some or all of the depths in the target log, the computing system 1310 can identify intervals of consecutive depths having the same layer type. For example, the computing system 1310 can determine that the depths ranging from 1000 meters (m) to 1231 m all have the same layer type. This may mean that all such depths belong to the same geological layer. So, the computing system 1310 can assign all of the consecutive depths in that depth interval to the same geological layer. The computing system 1310 can repeat this process to assign geological layers to the depths. Once the computing system 1310 has assigned geological layers to the depths, the computing system 1310 can determine interfaces between adjacent geological layers. These interfaces can represent geological tops. In this way, the computing system 1310 can determine the tops and types of the geological layers in the region surrounding the target wellbore.

Figure 16:
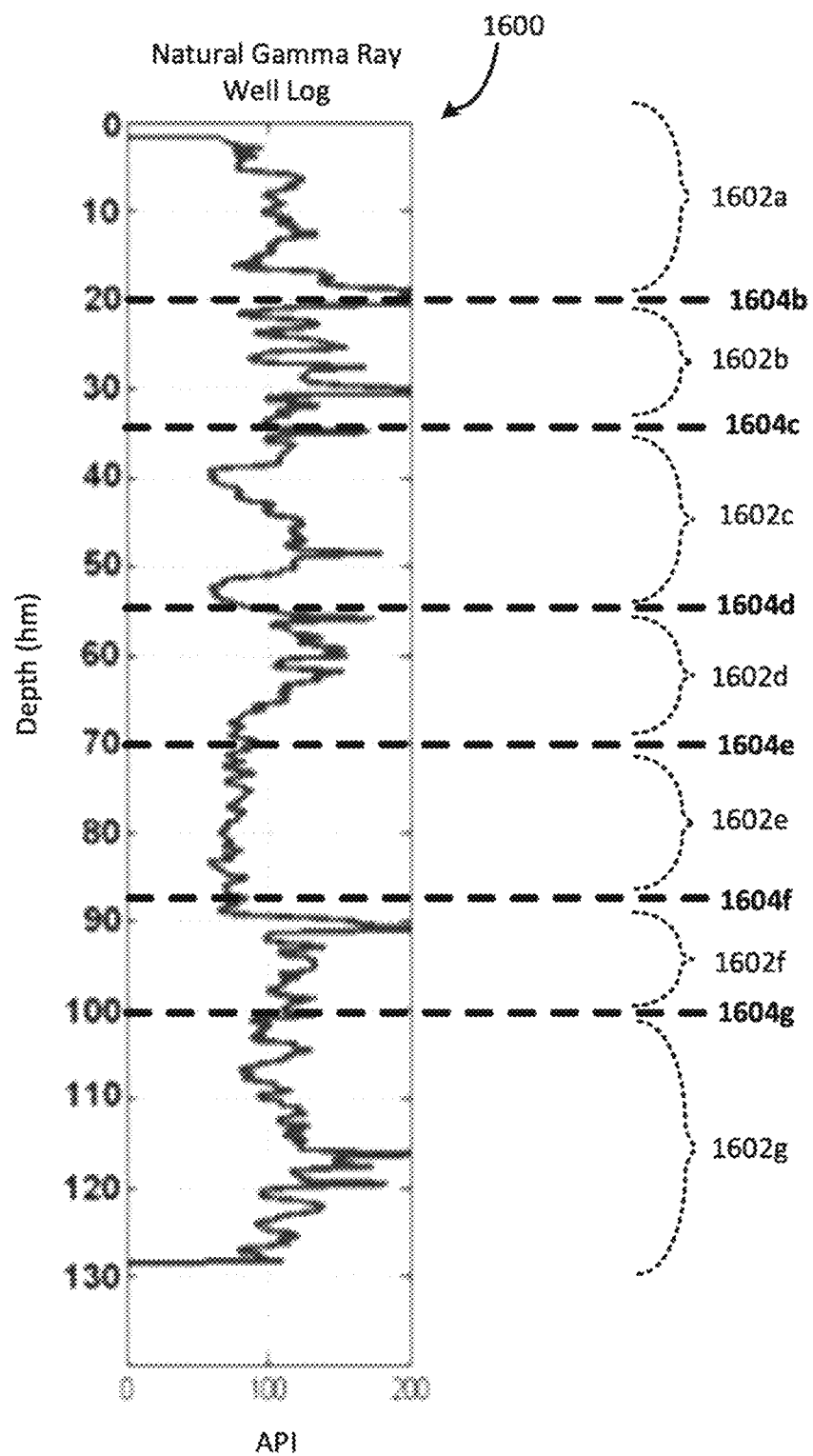
FIG. 16 depicts an example of a well log record and corresponding geological tops and layers according to some aspects.

One example of a target log 1600 with identified geological tops is shown in FIG. 16. The target log 1600 is a natural gamma ray well log in which depth is along the Y-axis and amplitude in American Petroleum Institute (API) units is along the X-axis. As shown, depth is in hectometers (hm) and increases down the page. In this example, the computing system 1310 has identified geological tops 1604b-g. The geological tops correspond to geological layers 1602b-g. For example, geological top 1604b is a top of geological layer 1602b, geological top 1604c is a top of geological layer 1602c, geological top 1604d is a top of geological layer 1602d, etc. Geological layer 1602 can extend from the geological top 1604b to the well surface.

In operation 1416, the computing system 1310 stores data for the geological tops and types associated with the target wellbore in memory for subsequent use.

In operation 1418, the computing system 1310 determines if there is another well cluster to analyze in the group of well clusters. If so, the process can return to operation 1406 where another well cluster can be selected for analysis. Otherwise, the process can continue to operation 1420.

In operation 1420, the computing system 1310 constructs a model (e.g., a reservoir model) based on the stored geological tops and types associated with the various wellbores in the various clusters. The model can be a multi-dimensional model of one or more target geological features, which may be selected by a user. For example, the computing system 1310 can identify and correlate a target geological feature (e.g., the same geological layer or reservoir) across some or all of the received well log records based on the tops and types of the geological layers identified with respect to each individual well log record, Because the well log records may be obtained from different wellbores in different geographical locations, they can have different spatial relationships to the target geological feature. These different spatial perspectives of the same geological feature can be identified and correlated to construct a mufti-dimensional representation of the target geological feature.

In operation 1422, the computing system 1310 simulates at least one well operation using the model. For example, the computing system 1310 can execute simulations software to simulate a drilling operation, casing operation, perforation operation, or production operation associated with extracting oil, water, or gas from a subterranean formation. The model can be used to constrain or inform the simulation. For example, the simulation can depend on the two-dimensional or three-dimensional surface shape and location of a target geological layer represented in the model when generating the simulation results.

Figure 17:
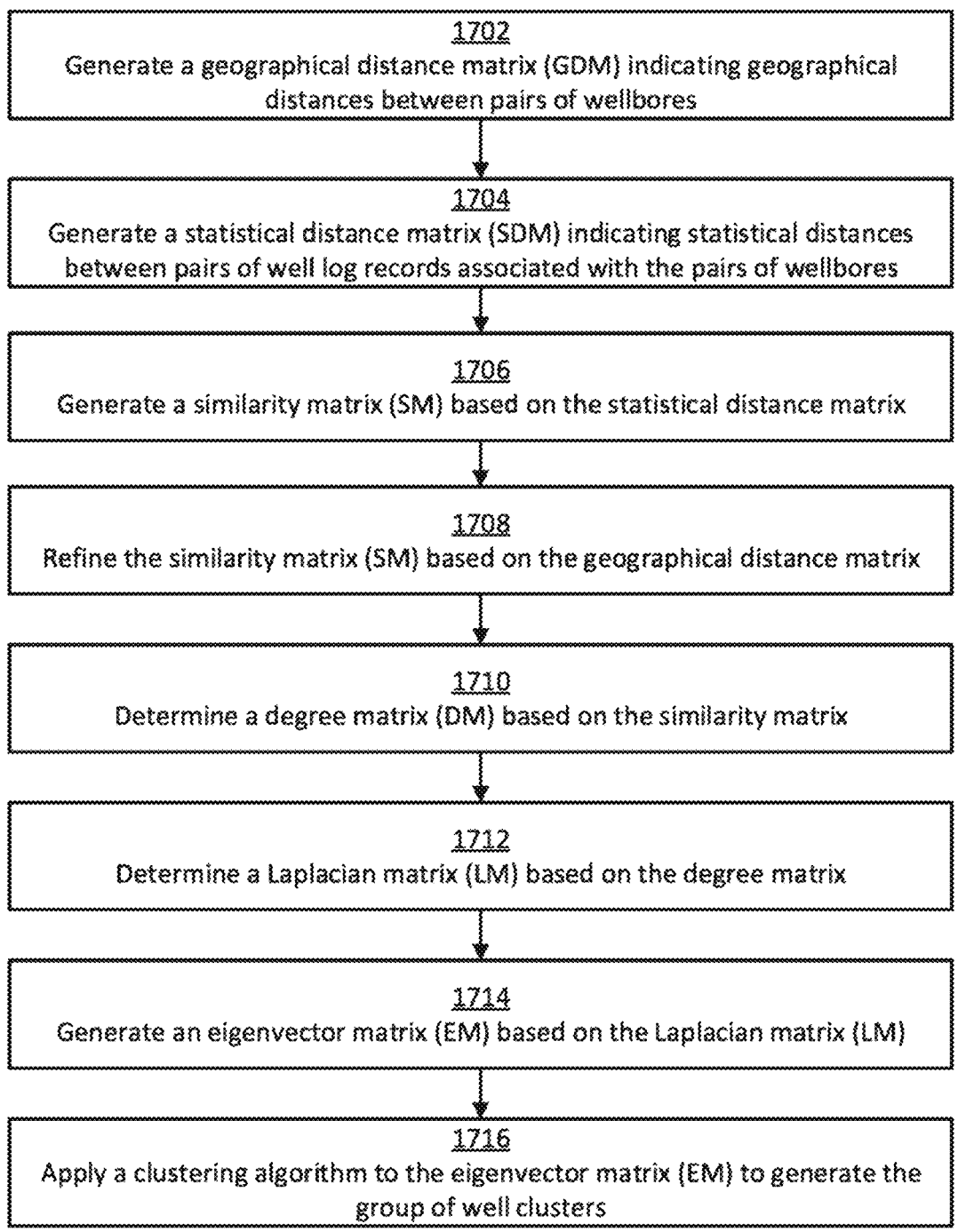
FIG. 17 depicts a flow chart of an example of a process for clustering wellbores into well clusters according to some aspects.

FIG. 17 is a flow chart of an example of a process for clustering wellbores into well clusters according to some aspects of the present disclosure. Other examples may involve more operations, fewer operations, different operations, or a different order of the operations shown in FIG. 17, The operations of FIG. 17 are described below with reference to the components of FIG. 13 described above.

In operation 1702, the computing system 1310 generates a geographical distance matrix (GDM) indicating geographical distances between pairs of wellbores. For example, the computing system 1310 can receive a group of well log records corresponding to group of wellbores. The computing system 1310 can also receive location data for each wellbore, where the location data indicates the geographical location of the wellbore. The location data can include, for example, latitude and longitude coordinates representing the physical location of the wellbore. The computing system 1310 can then compute the geographical distance between every pair of wellbores in the group and store the geographical distances in the geographical distance matrix. If the group of wellbores has M wellbores, the geographical distance matrix can be an M×M matrix of geographical distance values.

In operation 1704, the computing system 1310 generates a statistical distance matrix (SLIM) indicating statistical distances between pairs of well log records obtained from the pairs of wellbores. The computing system 1310 can compute the statistical distance between every pair of well log records and store the statistical distances in the statistical distance matrix.

Figure 18:
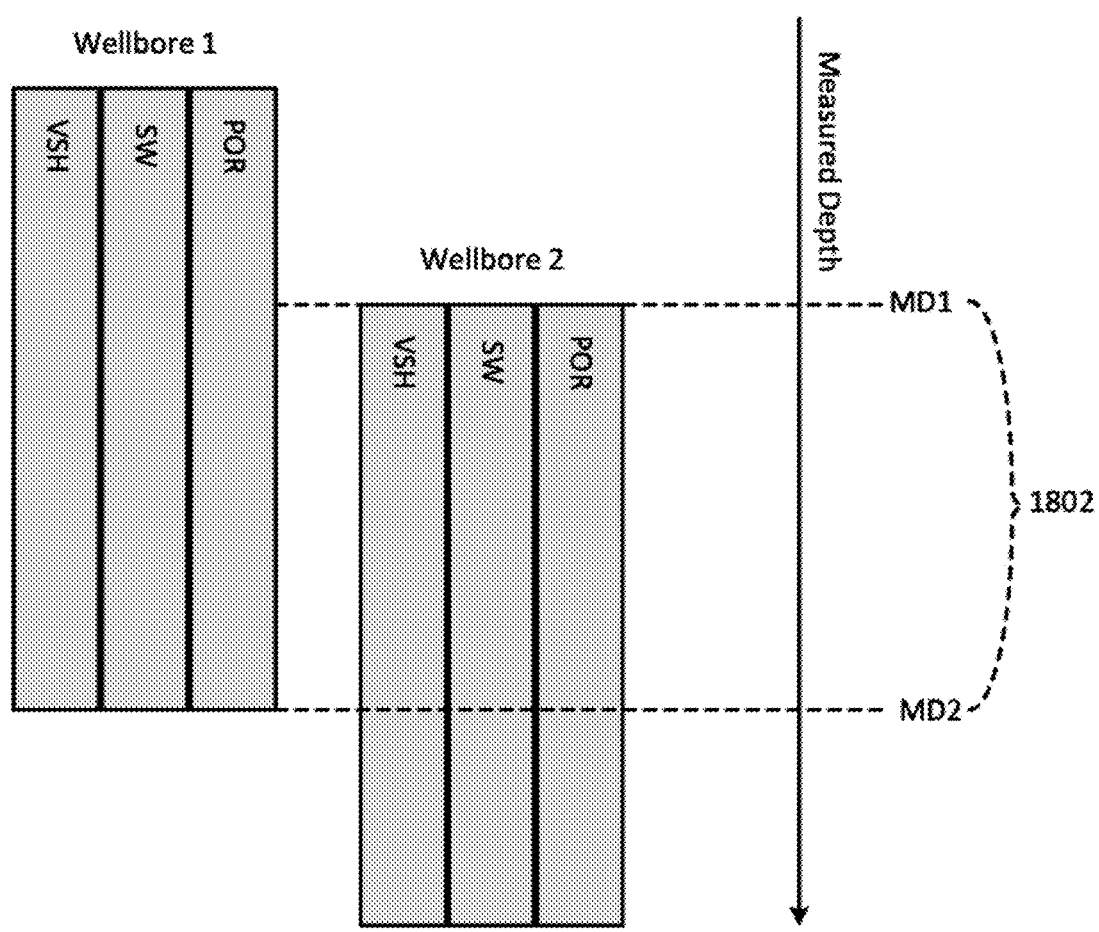
FIG. 18 depicts an example of an overlapping depth region between two wellbores according to some aspects.

To determine the statistical distance between the two well-log records, the computing system 1310 can first determine an overlapping depth range in the two wellbores based on variable values in the well log records. More specifically, the well log records can include variable values, which may be directly measured or derived from the measurements. Examples of the variables can include measured depth, porosity (POR), water saturation (WS), volume of shale (VSG), permeability (Perm), gamma-ray corrected shale volume (VSGC), corrected gamma-ray (EGR), compensated neutron porosity (CNLC), borehole compensated sonic (BHC), etc. To determine the overlapping depth range, the computing system 1310 can identify a first depth-range in the first well-log record where all of the variables of interest have non-missing values (e.g., non-null values). The computing system 1310 can also determine a second depth-range in the second well-log record where all of the variables of interest have non-missing values. The computing system 1310 can then determine an overlapping depth range between the first depth range and the second depth range. One particular example of this process is shown in FIG. 18, whereby the computing system 1310 can identify an overlapping depth range 1802 between measured depth 1 (MD1) and measured depth 2 (MD2) during which the corresponding well-log records have values for the variables POR, SW, and VSH.

Having determined the overlapping depth range, the computing system 1310 can then determine the statistical distance between the two well-log records based on the overlapping depth range. For example, the statistical distance between the pair of well log records can be computed according to the following equation:

$$SD = F/\sqrt{N} = \sqrt{\frac{\sum_{i=1}^{n}\sum_{j=1}^{m}|a_{ij}-b_{ij}|^2}{N}}$$

where SD is the statistical distance between the pair of well log records, F is a Frobenius norm, N is a normalization parameter corresponding to the number of observations in the well log records that have overlapping depths, n=N is the number of overlapping rows, m is the number of variables (e.g., the number of columns), $a_{ij}$ is an observation at the intersection of row i and column j in a first matrix representing a first well log record in the pair of well log records, and $b_{ij}$ is an observation at the intersection of row i and column j in a second matrix representing a second well log record in the pair of well log records. If there are no overlapping depths between the two well-log records, then a number larger than the largest computed statistical distance can be used for N. By executing the above process, if the group of wellbores has M wellbores, then the statistical distance matrix can be an M×M matrix of statistical distance values.

In operation 1706, the computing system 1310 generates a similarity matrix (SM) based on the statistical distance matrix. Each similarity value in the similarity matrix can represent a similarity between a pair of well log records.

In some examples, the computing system 1310 can generate the similarity matrix by applying a smoothing function to the statistical distance matrix. One example of the smoothing function can be Gaussian kernel. In one such example, the computing system 1310 can use a radial basis function (RBF) kernel, which is a type of Gaussian kernel, to convert the statistical distance matrix into the similarity matrix according to the following equation:

$$SM = \exp(-F^2/2\sigma^2)$$

where σ is a bandwidth parameter that is customizable for tuning the results.

In operation 1708, the computing system 1310 refines the similarity matrix (SM) based on the geographical distance matrix. For example, the computing system 1310 can set a similarity value in the similarity matrix to a predefined value when a certain condition is met. One example of such a condition may be that the geographical distance between the two wellbores corresponding to the similarity value exceeds a predefined threshold. For instance, the computing system 1310 can determine that a geographical distance value at location i, j ($GDV_{ij}$) in the geographical distance matrix exceeds the predefined threshold. Based on this determination, the computing system 1310 can set the corresponding similarity value at location i, j ($SMV_{ij}$) in the similarity matrix to zero.

In operation 1710, the computing system 1310 determines a degree matrix (DM) based on the similarity matrix. The degree matrix may be computed according to the following equation:

$$DM_{ii} = \sum_{j=1}^{m} SM_{ij}$$

where DM is the degree matrix, SM is the similarity matrix, m=M is the number of wellbores, and i and j are matrix locations. Off-diagonal elements of D can all be zeroes.

In operation 1712, the computing system 1310 determines a Laplacian matrix (LM) based on the degree matrix. The Laplacian matrix may be computed according to the following equation:

$$LM = (DM-SM)DM^{-1}$$

where DM is the degree matrix and SM is the similarity matrix.

In operation 1714, the computing system 1310 generates an eigenvector matrix (EM) based on the Laplacian matrix. For example, the computing system 1310 can perform eigenvalue decomposition of the Laplacian matrix, sort the eigenvalues in numerical order (e.g., ascending or descending order), and select X eigenvectors $u_1, \ldots, u_x$ of the Laplacian matrix corresponding to the X smallest eigenvalues. The computing system 1310 can then generate the eigenvector matrix using the vectors $u_1, \ldots, u_x$ as columns. This can be represented as $EM \in \mathbb{R}^{n \times X}$. For i=1, ..., n, let $y_i \in \mathbb{R}^X$ be the vector corresponding to the $i^{th}$ row of EM.

In operation 1716, the computing system 1310 applies a clustering algorithm to the rows of the eigenvector matrix to generate the group of well clusters. For example, the points ($y_i$), i=1, ..., n in $\mathbb{R}^K$ can be clustered into K clusters using a k-means clustering algorithm or another type of clustering algorithm. The number of clusters (K) may be selected to optimize the clustering process. For example, if the number of clusters is too low, the clustering algorithm may group together wellbores that are insufficiently similar into the same well cluster. This may lead to poor results in subsequent operations. And if the number of clusters is too high, the clustering algorithm may group wellbores that are sufficiently similar into different well clusters. This may also lead to poor results in subsequent operations. So, in some examples, the value of K may be selected to achieve the desired balance, which in turn can improve the accuracy of the automated process described herein. The value of K may be selected automatically or manually, for example based on analysis of an eigenvalue graph.

Once the wellbores are assigned to well clusters, the computing system 1310 can then implement the remainder of the process shown in FIG. 14. For example, the computing system 1310 can implement operations 1406-1422 based on the well clusters. Using these techniques, the computing system 1310 can automatically determine the characteristics (e.g., locations, tops, types, thicknesses, and geometries) of geological layers represented in multiple well-log records and correlate this information together, for example to generate multidimensional models of the geological layers.

Figure 19:
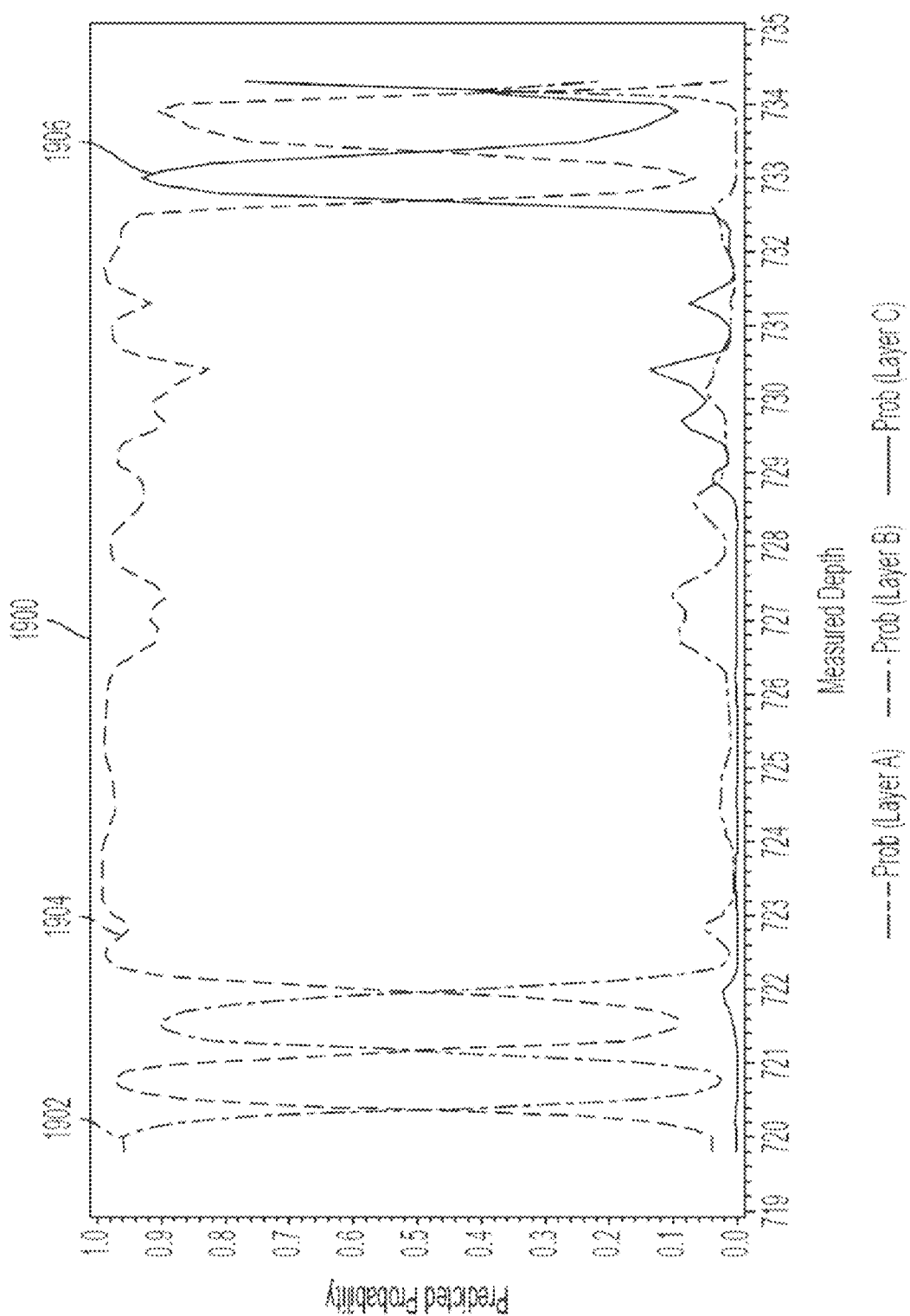
FIG. 19 depicts a graph of an example of oscillating probability outputs from a trained machine-learning model according to some aspects.

In some cases, the transition area between two geological layers (in which a geological top may exist) can span a depth range that has geological properties associated with both geological layers. This may confuse the trained machine-learning model into generating probability outputs that flip back-and-forth between predicted layer types. One example of this phenomenon is shown in the graph 1900 of FIG. 19. Graph 1900 plots the predicted probabilities of three layer types against depth. Line 1902 indicates the predicted probability that a given depth is layer A, line 1904 indicates the predicted probability that a given depth is layer B, and line 1906 indicates the predicted probability that a given depth is layer C. As shown, the layer type transitions from layer A to layer B in the depth range spanning from 720 m to 723 m. For depths in this transition range, the trained machine-learning model may output probabilities that flip back-and-forth between predicted layer types. This can be seen by the oscillations in lines 1902, 1904 within that depth range, A similar phenomenon can be seen on the right side of the graph 1900, where the layer type transitions from layer B to layer C in the depth range spanning from 732 m to 734.5 m. These oscillations may result in suboptimal identifications of geological top locations, for example in operation 1414 of FIG. 14. To help resolve this issue, some examples of the present disclosure can implement the following top-estimation process (e.g., as part of operation 1414).

First, the computing system 1310 can determine the probability-weighted center of each of the two adjacent geological layers, To determine the probability-weighted center for a particular geological layer, the computing system 1310 may use the following equation:

$$C_A = \frac{\sum_d Pr(A)_d d}{\sum_d Pr(A)_d}$$

where $C_A$ is the depth of the probability-weighted center of geological layer A, and $Pr(A)_d$ is a predicted probability of geological layer A at the depth d. One example of the probability probability-weighted centers of two adjacent geological layers A, B is shown in graph 2000 of FIG. 20. Line 2002 indicates the predicted probabilities that certain depths correspond to layer A, and line 2004 indicates the predicted probabilities that certain depths correspond to layer B. The probability-weighted center associated with layer A is shown as a dashed line labeled $C_A$, and the probability-weighted center associated with layer B is shown as a dashed line labeled $C_B$.

Figure 20:
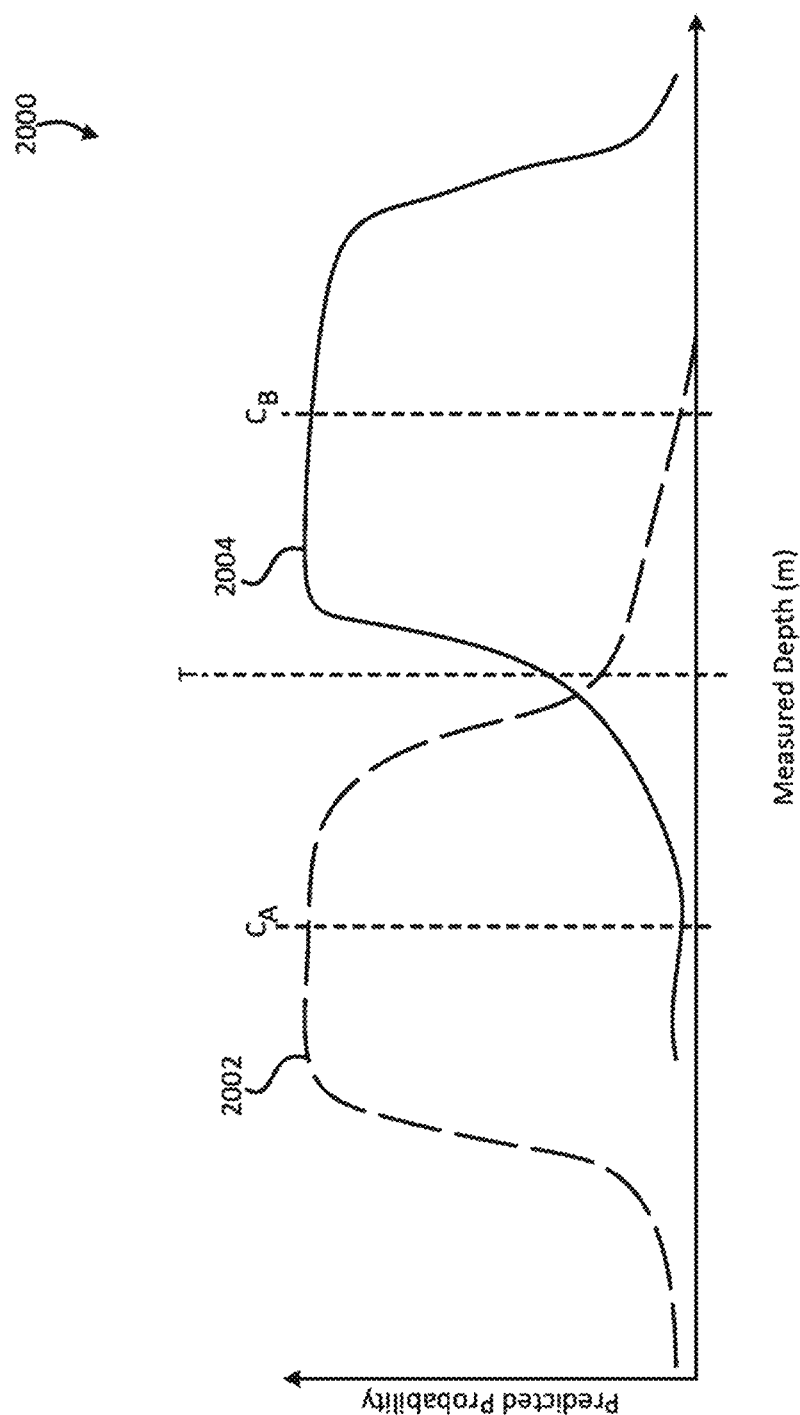
FIG. 20 depicts an example of a process for estimating the geological top between two adjacent geological layers according to some aspects.

Next, the computing system 1310 can estimate the depth of the top of layer B (below layer A) based on the probability-weighted centers of the geological layers. This depth can be represented by the letter T. The computing system 1310 may compute T using the following equation:

$$\frac{\sum_{C_A < d < T} Pr(A)_d}{N_A} = \frac{\sum_{T \le d < C_B} Pr(B)_d}{N_B}$$

where $N_A$ is the number of observations (e.g., depth points) between $C_A$ and T, and $N_B$ is the number of observations between T and $C_B$. An example of the estimated location of is also shown in FIG. 20. Using this technique, the computing system 1310 can determine a more accurate estimate of a geological top between adjacent geological layers. The computing system 1310 may iterate this process with respect to each adjacent pair of geological layers to better estimate the geological tops of the geological layers.

In the previous description, for the purposes of explanation, specific details are set forth in order to provide a thorough understanding of examples of the technology. But various examples can be practiced without these specific details. The figures and description are not intended to be restrictive.

The previous description provides examples that are not intended to limit the scope, applicability, or configuration of the disclosure. Rather, the previous description of the examples provides those skilled in the art with an enabling description for implementing an example. Various changes may be made in the function and arrangement of elements without departing from the spirit and scope of the technology as set forth in the appended claims.

Specific details are given in the previous description to provide a thorough understanding of the examples. But the examples may be practiced without these specific details. For example, circuits, systems, networks, processes, and other components can be shown as components in block diagram form to prevent obscuring the examples in unnecessary detail. In other examples, well-known circuits, processes, algorithms, structures, and techniques may be shown without unnecessary detail in order to avoid obscuring the examples.

Also, individual examples may have been described as a process that is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. And a process can have more or fewer operations than are depicted in a figure. A process can correspond to a method, a function, a procedure, a subroutine, a subprogram, etc. When a process corresponds to a function, its termination can correspond to a return of the function to the calling function or the main function.

Systems depicted in some of the figures can be provided in various configurations. In some examples, the systems can be configured as a distributed system where one or more components of the system are distributed across one or more networks in a cloud computing system.

The invention claimed is:

1. A system comprising:
one or more processors; and
one or more memory devices including instructions that are executable by the one or more processors for causing the one or more processors to:
receive a plurality of well log records associated with a plurality of wellbores drilled through geological layers;
generate a plurality of well clusters by applying a clustering process involving:
determining statistical distances between pairs of well log records in the plurality of well log records by, for each pair of well log records among the plurality of well log records:
determining a Frobenius norm associated with the pair of well log records, wherein the pair of well log records corresponds to a pair of wellbores in the plurality of wellbores;
determining a normalization parameter based on overlapping depths between the pair of wellbores; and
determining a statistical distance associated with the pair of wellbores based on the Frobenius norm and the normalization parameter;
determining geographical distances between pairs of wellbores in the plurality of wellbores, the geographical distances including a respective geographical distance between each pair of wellbores in the plurality of wellbores;
generating a similarity matrix based on the statistical distances and the geographical distances, the similarity matrix including similarity values indicating a respective similarity between each pair of wellbores in the plurality of wellbores; and
determining the plurality of well clusters using the similarity matrix; and
for each well cluster in the plurality of well clusters:
obtain a respective set of training data associated with the well cluster, wherein the respective set of training data includes a set of well log records labeled to indicate geological tops of the geological layers and to indicate types of the geological layers;
train a machine-learning model based on the respective set of training data to generate a trained machine-learning model;
select a target well-log record associated with a target wellbore of the well cluster, wherein the respective set of training data excludes the target well-log record;
provide the target well-log record as input to the trained machine-learning model, the trained machine-learning model being configured to generate an output usable to identify the geological tops of the geological layers in a region surrounding the target wellbore;
determine, based on the output from the trained machine-learning model, the geological tops of the geological layers in the region surrounding the target wellbore; and
transmit an electronic signal indicating the geological tops of the geological layers in the region surrounding the target wellbore.

2. The system of claim 1, wherein the one or more memory devices further include instructions that are executable by the one or more processors for causing the one or more processors to, for each pair of well log records among the plurality of well log records:
determine a number of overlapping depth values between the pair of wellbores based on the pair of well log records; and
generate the normalization parameter based on the number of overlapping depth values.

3. The system of claim 1, wherein the one or more memory devices further include instructions that are executable by the one or more processors for causing the one or more processors to:
generate the similarity matrix by applying a smoothing function to the statistical distances;
determine a subset of the geographical distances that exceed a predefined threshold value;
identify a subset of similarity values in the similarity matrix that correspond to the subset of geographical distances; and
set the subset of similarity values to zero in the similarity matrix.

4. The system of claim 3, wherein the one or more memory devices further include instructions that are executable by the one or more processors for causing the one or more processors to generate the plurality of well clusters by:
generating a degree matrix based on the similarity matrix;
determining a Laplacian matrix based on the degree matrix;
performing eigenvalue decomposition of the Laplacian matrix to determine a plurality of eigenvalues;
selecting a subset of eigenvalues, from among the plurality of eigenvalues, that have the lowest numerical values relative to other eigenvalues in the plurality of eigenvalues;
identifying eigenvectors in the Laplacian matrix that correspond to the subset of eigenvalues;
generating an eigenvector matrix that includes the eigenvectors; and
applying a clustering algorithm to the eigenvector matrix to generate the plurality of well clusters.

5. The system of claim 1, wherein the output from the trained machine-learning model includes a plurality of sets of probabilities corresponding to a plurality of depths in the target well-log record, each set of probabilities in the plurality of sets of probabilities corresponding to a particular measured depth of the plurality of depths, and each probability in the set of probabilities indicating a likelihood that a geological layer intersected by the target wellbore at the particular measured depth is of a corresponding layer type.

6. The system of claim 5, wherein the one or more memory devices further include instructions that are executable by the one or more processors for causing the one or more processors to:
assign a plurality of layer types to the plurality of depths by, for each measured depth in the plurality of depths:
determining the set of probabilities corresponding to the measured depth from among the plurality of sets of probabilities;
determining a layer type that corresponds to a highest probability value in the set of probabilities; and
assigning the layer type to the measured depth; and
determine the geological tops in the region surrounding the target wellbore based on the plurality of layer types assigned to the plurality of depths.

7. The system of claim 6, wherein the one or more memory devices further include instructions that are executable by the one or more processors for causing the one or more processors to determine a geological top of a first geological layer in the region by:
  identifying, from among the plurality of depths, a first set of consecutive depths corresponding to the first geological layer;
  determining a first set of probabilities associated with the first set of consecutive depths;
  identifying, from among the plurality of depths, a second set of consecutive depths corresponding to a second geological layer in the region, the second geological layer being adjacent to the first geological layer;
  determining a second set of probabilities associated with the second set of consecutive depths;
  determining a first center of the first geological layer based on the first set of probabilities;
  determining a second center of the second geological layer based on the second set of probabilities; and
  estimating the geological top of the first geological layer based on the first center and the second center.

8. The system of claim 7, wherein the one or more memory devices further include instructions that are executable by the one or more processors for causing the one or more processors to estimate the geological top of the first geological layer by determining a particular depth value at which a first computed value is equal to a second computed value, the particular depth value being the geological top.

9. The system of claim 8, wherein:
  the first computed value is a first summation of first probability values divided by a first number of depth measurements that are between the first center and the particular depth value in the first set of consecutive depths; and
  the second computed value is a second summation of second probability values divided by a second number of depth measurements that are between the second center and the particular depth value in the second set of consecutive depths.

10. The system of claim 1, wherein the one or more memory devices further include instructions that are executable by the one or more processors for causing the one or more processors to:
  construct a geological model based on the geological tops of the geological layers in the region surrounding the target wellbore; and
  simulate at least one well operation associated with the target wellbore using the geological model.

11. A method comprising:
  receiving, by one or more processors, a plurality of well log records associated with a plurality of wellbores drilled through geological layers;
  generating, by the one or more processors, a plurality of well clusters by applying a clustering process involving:
    determining statistical distances between pairs of well log records in the plurality of well log records, the statistical distances including a respective statistical distance between each pair of well log records in the plurality of well log records, wherein the respective statistical distance between a respective pair of well log records is determined based on a respective pair of matrices generated from the respective pair of well log records;
    determining geographical distances between pairs of wellbores in the plurality of wellbores, the geographical distances including a respective geographical distance between each pair of wellbores in the plurality of wellbores;
    generating a similarity matrix based on the statistical distances and the geographical distances, the similarity matrix including similarity values indicating a respective similarity between each pair of wellbores in the plurality of wellbores;
    generating a degree matrix based on the similarity matrix;
    determining a Laplacian matrix based on the degree matrix;
    performing eigenvalue decomposition of the Laplacian matrix to determine a plurality of eigenvalues;
    selecting a subset of eigenvalues, from among the plurality of eigenvalues, that have the lowest numerical values relative to other eigenvalues in the plurality of eigenvalues;
    identifying eigenvectors in the Laplacian matrix that correspond to the subset of eigenvalues;
    generating an eigenvector matrix that includes the eigenvectors; and
    applying a clustering algorithm to the eigenvector matrix to generate the plurality of well clusters; and
  for each well cluster in the plurality of well clusters:
    obtaining, by the one or more processors, a respective set of training data associated with the well cluster, wherein the respective set of training data includes a set of well log records labeled to indicate geological tops of the geological layers and to indicate types of the geological layers;
    training, by the one or more processors, a machine-learning model based on the respective set of training data to generate a trained machine-learning model;
    selecting, by the one or more processors, a target well-log record associated with a target wellbore of the well cluster, wherein the respective set of training data excludes the target well-log record;
    providing, by the one or more processors, the target well-log record as input to the trained machine-learning model, the trained machine-learning model being configured to generate an output usable to identify the geological tops of the geological layers in a region surrounding the target wellbore;
    determining, by the one or more processors and based on the output from the trained machine-learning model, the geological tops of the geological layers in the region surrounding the target wellbore; and
    transmitting, by the one or more processors, an electronic signal indicating the geological tops of the geological layers in the region surrounding the target wellbore.

12. The method of claim 11, further comprising determining the statistical distances by, for each pair of well log records among the plurality of well log records:
  determining a Frobenius norm associated with the pair of well log records, wherein the pair of well log records corresponds to a pair of wellbores in the plurality of wellbores;
  determining a normalization parameter based on overlapping depths between the pair of wellbores; and
  determining a statistical distance associated with the pair of wellbores based on the Frobenius norm and the normalization parameter.

13. The method of claim 12, further comprising, for each pair of well log records among the plurality of well log records:
  determining a number of overlapping depth values between the pair of wellbores based on the pair of well log records; and generating the normalization parameter based on the number of overlapping depth values.

14. The method of claim 11, further comprising:
generating the similarity matrix by applying a smoothing function to the statistical distances;
determining a subset of the geographical distances that exceed a predefined threshold value;
identifying a subset of similarity values in the similarity matrix that correspond to the subset of geographical distances; and
setting the subset of similarity values to zero in the similarity matrix.

15. The method of claim 11, wherein the output from the trained machine-learning model includes a plurality of sets of probabilities corresponding to a plurality of depths in the target well-log record, each set of probabilities in the plurality of sets of probabilities corresponding to a particular measured depth of the plurality of depths, and each probability in the set of probabilities indicating a likelihood that a geological layer intersected by the target wellbore at the particular measured depth is of a corresponding layer type.

16. The method of claim 15, further comprising:
assigning a plurality of layer types to the plurality of depths by, for each measured depth in the plurality of depths:
determining the set of probabilities corresponding to the measured depth from among the plurality of sets of probabilities;
determining a layer type that corresponds to a highest probability value in the set of probabilities; and
assigning the layer type to the measured depth; and
determining the geological tops in the region surrounding the target wellbore based on the plurality of layer types assigned to the plurality of depths.

17. The method of claim 16, further comprising determining a geological top of a first geological layer in the region by:
identifying, from among the plurality of depths, a first set of consecutive depths corresponding to the first geological layer;
determining a first set of probabilities associated with the first set of consecutive depths;
identifying, from among the plurality of depths, a second set of consecutive depths corresponding to a second geological layer in the region, the second geological layer being adjacent to the first geological layer;
determining a second set of probabilities associated with the second set of consecutive depths;
determining a first center of the first geological layer based on the first set of probabilities;
determining a second center of the second geological layer based on the second set of probabilities; and
estimating the geological top of the first geological layer based on the first center and the second center.

18. The method of claim 17, further comprising estimating the geological top of the first geological layer by determining a particular depth value at which a first computed value is equal to a second computed value, the particular depth value being the geological top.

19. The method of claim 18, wherein:
the first computed value is a first summation of first probability values divided by a first number of depth measurements that are between the first center and the particular depth value in the first set of consecutive depths; and
the second computed value is a second summation of second probability values divided by a second number of depth measurements that are between the second center and the particular depth value in the second set of consecutive depths.

20. The method of claim 11, further comprising:
constructing a geological model based on the geological tops of the geological layers in the region surrounding the target wellbore; and
simulating at least one well operation associated with the target wellbore using the geological model.

21. A non-transitory computer-readable medium comprising program code that is executable by one or more processors for causing the one or more processors to:
receive a plurality of well log records associated with a plurality of wellbores drilled through geological layers;
generate a plurality of well clusters by applying a clustering process involving:
determining statistical distances between pairs of well log records in the plurality of well log records, the statistical distances including a respective statistical distance between each pair of well log records in the plurality of well log records, wherein the respective statistical distance between a respective pair of well log records is determined based on a respective pair of matrices generated from the respective pair of well log records;
determining geographical distances between pairs of wellbores in the plurality of wellbores, the geographical distances including a respective geographical distance between each pair of wellbores in the plurality of wellbores;
generating a similarity matrix based on the statistical distances and the geographical distances, the similarity matrix including similarity values indicating a respective similarity between each pair of wellbores in the plurality of wellbores; and
determining the plurality of well clusters using the similarity matrix; and
for each well cluster in the plurality of well clusters:
obtain a respective set of training data associated with the well cluster, wherein the respective set of training data includes a set of well log records labeled to indicate geological tops of the geological layers and to indicate types of the geological layers;
train a machine-learning model based on the respective set of training data to generate a trained machine-learning model;
select a target well-log record associated with a target wellbore of the well cluster, wherein the respective set of training data excludes the target well-log record;
provide the target well-log record as input to the trained machine-learning model, the trained machine-learning model being configured to generate an output usable to identify the geological tops of the geological layers in a region surrounding the target wellbore, wherein the output from the trained machine-learning model includes a plurality of sets of probabilities corresponding to a plurality of depths in the target well-log record, each set of probabilities in the plurality of sets of probabilities corresponding to a particular measured depth of the plurality of depths, and each probability in the set of probabilities indicating a likelihood that a geological layer intersected by the target wellbore at the particular measured depth is of a corresponding layer type;

assign a plurality of layer types to the plurality of depths by, for each measured depth in the plurality of depths:
  determining the set of probabilities corresponding to the measured depth from among the plurality of sets of probabilities;
  determining a layer type that corresponds to a highest probability value in the set of probabilities; and
  assigning the layer type to the measured depth;
determine the geological tops of the geological layers in the region surrounding the target wellbore based on the plurality of layer types assigned to the plurality of depths; and
transmit an electronic signal indicating the geological tops of the geological layers in the region surrounding the target wellbore.

22. The non-transitory computer-readable medium of claim 21, further comprising program code that is executable by the one or more processors for causing the one or more processors to determine the statistical distances by, for each pair of well log records among the plurality of well log records:
  determining a Frobenius norm associated with the pair of well log records, wherein the pair of well log records corresponds to a pair of wellbores in the plurality of wellbores;
  determining a normalization parameter based on overlapping depths between the pair of wellbores; and
  determining a statistical distance associated with the pair of wellbores based on the Frobenius norm and the normalization parameter.

23. The non-transitory computer-readable medium of claim 22, further comprising program code that is executable by the one or more processors for causing the one or more processors to, for each pair of well log records among the plurality of well log records:
  determine a number of overlapping depth values between the pair of wellbores based on the pair of well log records; and
  generate the normalization parameter based on the number of overlapping depth values.

24. The non-transitory computer-readable medium of claim 22, further comprising program code that is executable by the one or more processors for causing the one or more processors to:
  generate the similarity matrix by applying a smoothing function to the statistical distances;
  determine a subset of the geographical distances that exceed a predefined threshold value;
  identify a subset of similarity values in the similarity matrix that correspond to the subset of geographical distances; and
  set the subset of similarity values to zero in the similarity matrix.

25. The non-transitory computer-readable medium of claim 22, further comprising program code that is executable by the one or more processors to generate the plurality of well clusters by:
  generating a degree matrix based on the similarity matrix;
  determining a Laplacian matrix based on the degree matrix;
  performing eigenvalue decomposition of the Laplacian matrix to determine a plurality of eigenvalues;
  selecting a subset of eigenvalues, from among the plurality of eigenvalues, that have the lowest numerical values relative to other eigenvalues in the plurality of eigenvalues;
  identifying eigenvectors in the Laplacian matrix that correspond to the subset of eigenvalues;
  generating an eigenvector matrix that includes the eigenvectors; and
  applying a clustering algorithm to the eigenvector matrix to generate the plurality of well clusters.

26. The non-transitory computer-readable medium of claim 21, further comprising program code that is executable by the one or more processors for causing the one or more processors to determine a geological top of a first geological layer in the region by:
  identifying, from among the plurality of depths, a first set of consecutive depths corresponding to the first geological layer;
  determining a first set of probabilities associated with the first set of consecutive depths;
  identifying, from among the plurality of depths, a second set of consecutive depths corresponding to a second geological layer in the region, the second geological layer being adjacent to the first geological layer;
  determining a second set of probabilities associated with the second set of consecutive depths;
  determining a first center of the first geological layer based on the first set of probabilities;
  determining a second center of the second geological layer based on the second set of probabilities; and
  estimating the geological top of the first geological layer based on the first center and the second center.

27. The non-transitory computer-readable medium of claim 26, further comprising program code that is executable by the one or more processors for causing the one or more processors to estimate the geological top of the first geological layer by determining a particular depth value at which a first computed value is equal to a second computed value, the particular depth value being the geological top.

28. The non-transitory computer-readable medium of claim 27, wherein:
  the first computed value is a first summation of first probability values divided by a first number of depth measurements that are between the first center and the particular depth value in the first set of consecutive depths; and
  the second computed value is a second summation of second probability values divided by a second number of depth measurements that are between the second center and the particular depth value in the second set of consecutive depths.

29. The non-transitory computer-readable medium of claim 21, further comprising program code that is executable by the one or more processors for causing the one or more processors to:
  construct a geological model based on the geological tops of the geological layers in the region surrounding the target wellbore; and
  simulate at least one well operation associated with the target wellbore using the geological model.

* * * * *